US012261815B2

(12) United States Patent
Ritchie et al.

(10) Patent No.: US 12,261,815 B2
(45) Date of Patent: *Mar. 25, 2025

(54) INITIATING A BUSINESS MESSAGING SESSION

(71) Applicant: Apple Inc., Cupertino, CA (US)

(72) Inventors: Grant C. Ritchie, Los Gatos, CA (US); Mithilesh Kumar, San Jose, CA (US); Austin A. Marusco, San Francisco, CA (US); Akshay Bapat, Sunnyvale, CA (US); John N. Meehan, Campbell, CA (US); Elmira Petrenco, San Jose, CA (US); Malay Mallick, San Jose, CA (US); Sampath Sree Kumar Kolluru, Sunnyvale, CA (US); Adam R. Podstawczynski, Lodz (PL); Zhaoyuan Ye, San Jose, CA (US); Jae Woo Chang, Cupertino, CA (US); Marcel Van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,693

(22) Filed: Jun. 1, 2020

(65) Prior Publication Data

US 2020/0366636 A1 Nov. 19, 2020

Related U.S. Application Data

(63) Continuation of application No. 16/428,897, filed on May 31, 2019, which is a continuation-in-part of
(Continued)

(51) Int. Cl.
*H04L 51/56* (2022.01)
*H04L 9/40* (2022.01)
(Continued)

(52) U.S. Cl.
CPC .......... *H04L 51/56* (2022.05); *H04L 61/4552* (2022.05); *H04L 67/52* (2022.05); *H04L 2101/65* (2022.05)

(58) Field of Classification Search
CPC ..... H04L 51/36; H04L 61/1552; H04L 67/18; H04L 51/56; H04L 61/4552; H04L 67/52; H04L 2101/65
(Continued)

(56) References Cited

U.S. PATENT DOCUMENTS

| 7,437,358 B2 | 10/2008 | Arrouye et al. |
| 8,805,346 B1 | 8/2014 | Zhang |

(Continued)

FOREIGN PATENT DOCUMENTS

| CN | 102457628 | 5/2012 |
| CN | 103078949 | 5/2013 |

(Continued)

OTHER PUBLICATIONS

Anonymous: "XMPP—Wikipedia," Jul. 2, 2016, retrieved from http://en.wikipedia.org/w/index.php?title=XMPP&oldid=727983386, 10 pages.

(Continued)

*Primary Examiner* — Christopher B Robinson
(74) *Attorney, Agent, or Firm* — BAKERHOSTETLER

(57) ABSTRACT

A device implementing a system for initiating a business messaging session includes at least one processors configured to receive a selection of a telephone number on a device. The at least one processor is further configured to transmit an encoded identifier corresponding to the telephone number to a server. The at least one processor is further configured to determine whether the telephone number is registered for a business messaging system based at least in part on a response received from the server. The at
(Continued)

least one processor is further configured to provide a first display element for initiating communication with the telephone number via the business messaging system when the telephone number is registered for the business messaging system, otherwise providing a second display element for initiating communication with the telephone number via a user messaging system.

20 Claims, 27 Drawing Sheets

Related U.S. Application Data application No. 15/721,571, filed on Sep. 29, 2017, now Pat. No. 10,764,340.

(60) Provisional application No. 62/507,163, filed on May 16, 2017.

(51) Int. Cl.
  H04L 61/4552 (2022.01)
  H04L 67/52 (2022.01)
  H04L 101/65 (2022.01)

(58) Field of Classification Search
  USPC .......................................................... 709/206
  See application file for complete search history.

(56) References Cited

U.S. PATENT DOCUMENTS

| | | | |
|---|---|---|---|
| 8,849,838 B2* | 9/2014 | Wang | G06F 16/90335 |
| | | | 707/754 |
| 8,929,517 B1 | 1/2015 | Lavian | |
| 9,769,153 B1* | 9/2017 | Bowen | H04L 63/0823 |
| 9,928,178 B1* | 3/2018 | Solapurkar | H04L 67/568 |
| 2001/0024497 A1 | 9/2001 | Campbell | |
| 2002/0049760 A1* | 4/2002 | Scott | H04L 67/104 |
| 2003/0120559 A1 | 6/2003 | Don | |
| 2005/0233733 A1 | 10/2005 | Roundtree | |
| 2006/0093109 A1 | 5/2006 | Van Natter | |
| 2007/0005713 A1* | 1/2007 | LeVasseur | H04L 63/08 |
| | | | 709/206 |
| 2007/0061301 A1 | 3/2007 | Ramer | |
| 2007/0265873 A1 | 11/2007 | Sheth et al. | |
| 2008/0201429 A1 | 8/2008 | Barbell | |
| 2010/0138901 A1 | 6/2010 | Zhang | |
| 2010/0167701 A1* | 7/2010 | Sagawa | G06Q 10/109 |
| | | | 715/764 |
| 2010/0228701 A1* | 9/2010 | Harris, III | H04L 51/212 |
| | | | 711/216 |
| 2010/0250929 A1 | 9/2010 | Schultz | |
| 2010/0262549 A1 | 10/2010 | Kannan | |
| 2010/0324961 A1 | 12/2010 | Singh | |
| 2011/0050576 A1 | 3/2011 | Forutanpour | |
| 2011/0078270 A1 | 3/2011 | Galli | |
| 2011/0246287 A1 | 10/2011 | Wright | |
| 2011/0320423 A1 | 12/2011 | Gemmell | |
| 2012/0030021 A1 | 2/2012 | Gupta | |
| 2012/0072261 A1 | 3/2012 | Oberoi | |
| 2012/0210238 A1* | 8/2012 | McCoy | G06F 9/452 |
| | | | 709/227 |
| 2012/0245944 A1 | 9/2012 | Gruber | |
| 2012/0309465 A1 | 12/2012 | Tani | |
| 2012/0315607 A1 | 12/2012 | Shin | |
| 2013/0115929 A1 | 5/2013 | Morifuku | |
| 2013/0252642 A1 | 9/2013 | Park | |
| 2014/0040786 A1 | 2/2014 | Swanson | |
| 2014/0136250 A1 | 5/2014 | Lee | |
| 2014/0280612 A1 | 9/2014 | Beslic | |
| 2014/0358632 A1 | 12/2014 | Graff | |
| 2015/0172227 A1 | 6/2015 | Grove, II | |
| 2015/0186430 A1 | 7/2015 | Heffernan et al. | |
| 2015/0207725 A1* | 7/2015 | Hui | H04L 1/00 |
| | | | 370/390 |
| 2015/0235289 A1 | 8/2015 | Jeremias | |
| 2015/0262188 A1 | 9/2015 | Franco | |
| 2015/0304268 A1 | 10/2015 | Byttow | |
| 2015/0312186 A1* | 10/2015 | Giura | H04L 51/212 |
| | | | 709/206 |
| 2015/0319203 A1 | 11/2015 | Jeremias | |
| 2015/0341752 A1 | 11/2015 | Flynn | |
| 2015/0358265 A1 | 12/2015 | Kaplinger et al. | |
| 2015/0371265 A1 | 12/2015 | Leisher | |
| 2015/0378592 A1 | 12/2015 | Kim | |
| 2016/0162555 A1 | 6/2016 | Shapira | |
| 2016/0165571 A1 | 6/2016 | Malee | |
| 2016/0366088 A1 | 12/2016 | Abou et al. | |
| 2017/0053286 A1 | 2/2017 | Bhagat | |
| 2017/0064035 A1 | 3/2017 | Lai | |
| 2017/0103432 A1 | 4/2017 | Borchetta | |
| 2017/0293982 A1 | 10/2017 | Gupta | |
| 2017/0295119 A1 | 10/2017 | Rosenberg | |
| 2017/0373997 A1* | 12/2017 | Deng | H04L 67/5682 |
| 2018/0096686 A1 | 4/2018 | Borsutsky | |
| 2018/0152461 A1* | 5/2018 | Albisu | H04L 63/14 |
| 2018/0357072 A1 | 12/2018 | Karnati et al. | |

FOREIGN PATENT DOCUMENTS

| | | |
|---|---|---|
| CN | 104023141 | 9/2014 |
| CN | 105763417 | 7/2016 |
| CN | 105917626 | 8/2016 |
| CN | 107430673 | 12/2017 |

OTHER PUBLICATIONS

Google: "About Google My Business," Apr. 18, 2016, retrieved from https://web.archive.org/web/20160418091417/https://support.google.com/business/answer/3038063?hl=en-GB, 3 pages.
Extended European Search Report from European Patent Application No. 18171720.8, dated Jul. 13, 2018, 8 pages.
European Office Action from European Patent Application No. 18171720.8, dated Jun. 18, 2019, 6 pages.
International Search Report and Written Opinion from PCT/US2020/028483, dated Aug. 14, 2020, 13 pages.
Chinese Office Action from Chinese Patent Application No. 201810464528.2, dated Jun. 30, 2020, 25 pages including machine-generated English language translation.
Summons to attend oral proceedings from European Patent Application No. 18171720.8, dated Nov. 17, 2020, 9 pages.
Chinese Notice of Allowance from Chinese Patent Application No. 201810464528.2, dated Jun. 28, 2021, 4 pages including English language translation.
European Office Action from European Patent Application No. 18171720.8, dated Jul. 12, 2021, 17 pages.
Extended European Search Report from European Patent Application No. 21196142.0, dated Dec. 14, 2021, 7 pages.
European Office Action from European Patent Application No. 20727875.5, dated Mar. 23, 2023, 6 pages.
Chinese Office Action from Chinese Patent Application No. 202111067848.2, dated Aug. 26, 2026, 19 pages including English language translation.
Chinese Office Action from Chinese Patent Application No. 202080039142.2, dated Oct. 26, 2022, 22 pages including English language translation.
Zawinski, et al., "RFC 6068—The 'mailto' URI Scheme," Oct. 2010, retrieved from https://datatracker.ietf. org/doc/html1/rfc6068, 17 pages.
Wilde, et al., "RFC 5724—URI Scheme for Global System for Mobile Communications (GSM) Short Message Service (SMS)," Jan. 2010, retrieved from https://datatracker.ietf.org/doc/html/rfc5724, 18 pages.
Peterson, RFC 3860—Common Profile for Instant Messaging (CPIM),' Aug. 2004, retrieved from https://datatracker.ietf.org/doc/html/rfc3860, 13 pages.

(56) References Cited

OTHER PUBLICATIONS

European Office Action from European Patent Application No. 21196142.0, dated Jan. 31, 2024, 7 pages.

* cited by examiner

Fields For Registration

- Company name, address(es), phone, business type, company contacts, URLs

- Brand information (e.g., name, logo, etc.)

- MSP (if selected)

- Locations (optional) (e.g., name, address, phone, open hours, URLs, etc.)

- Customizable fields

- Brand authorization (relationship, brand rep information) (optional)

- Limitations on amount of concurrent or new messaging sessions for organization or business (optional)

*FIG. 4*

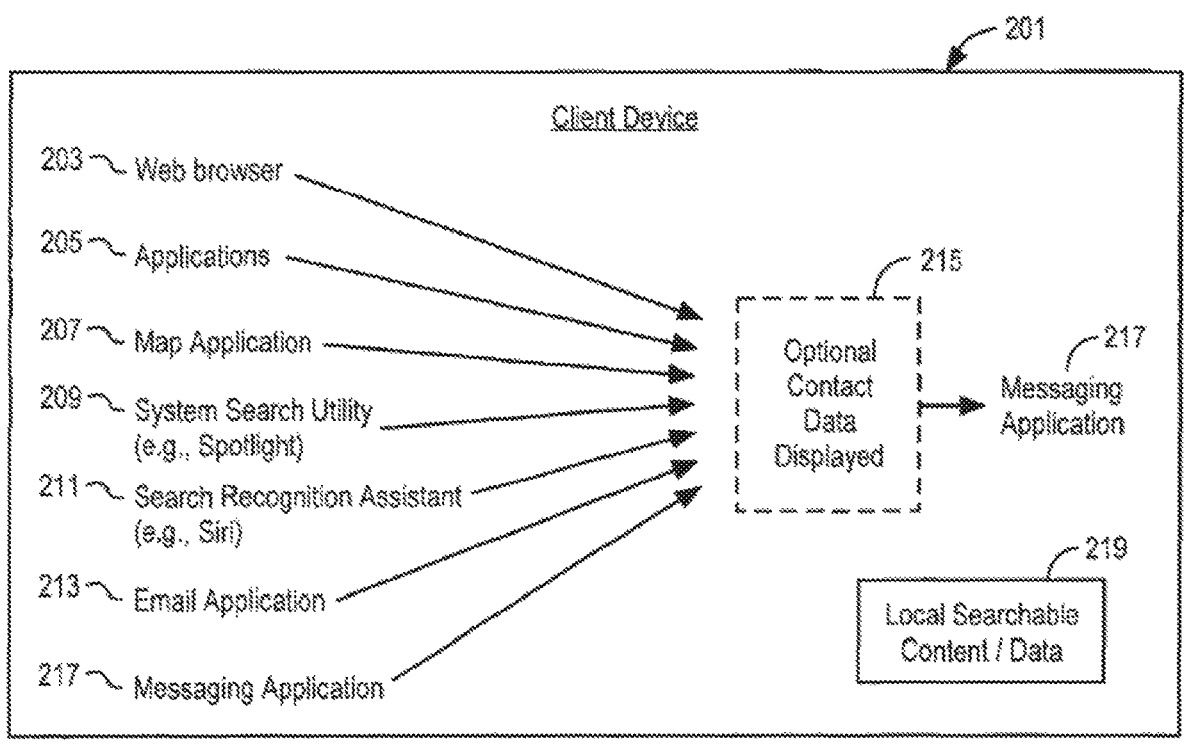

*FIG. 5*

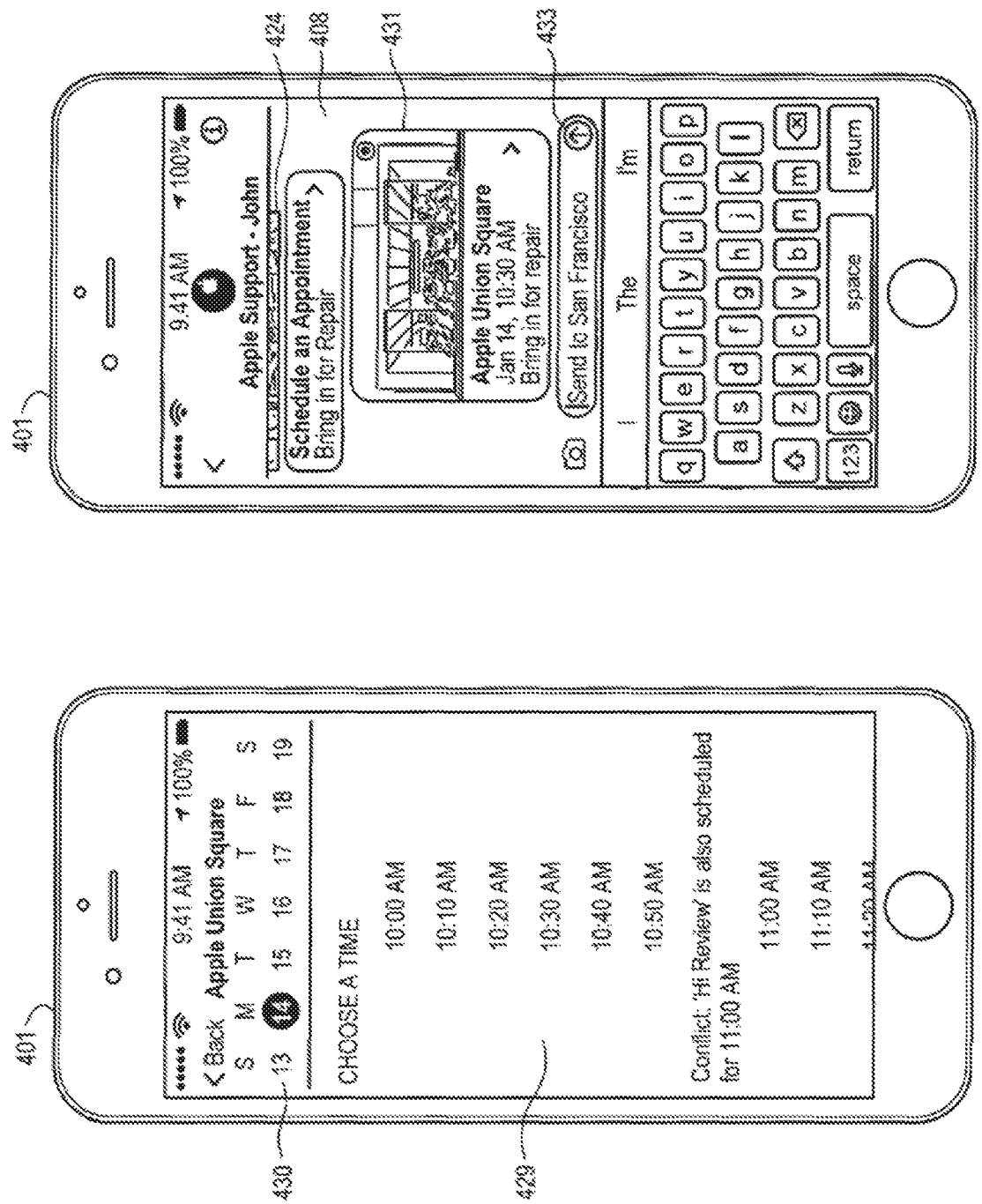

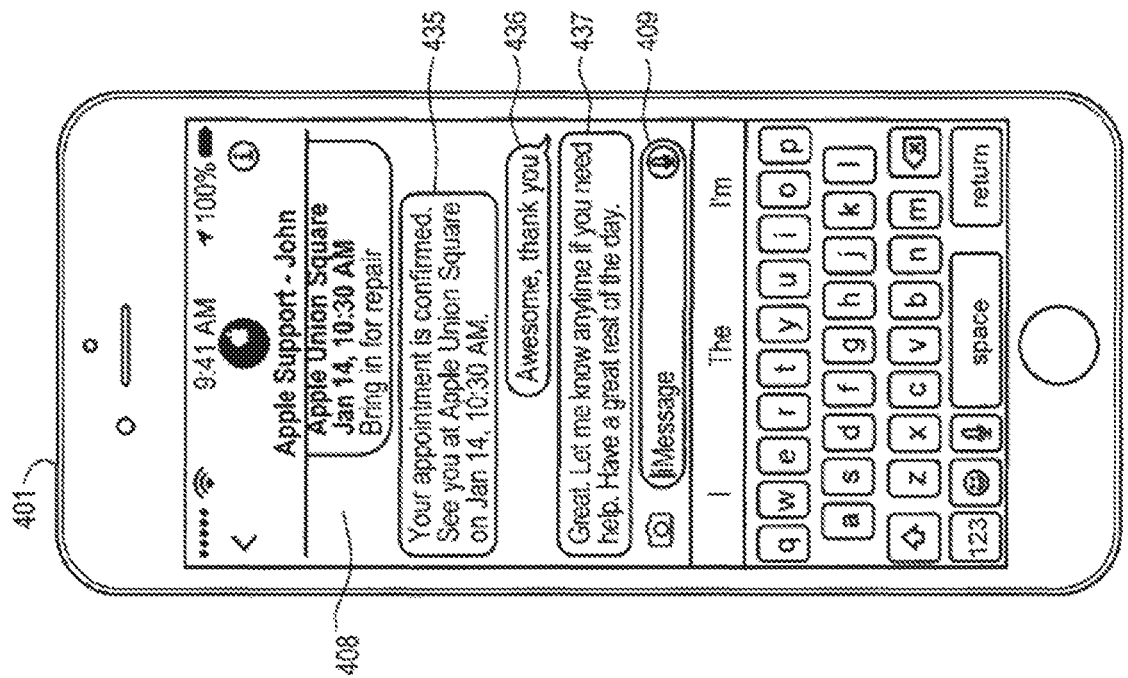
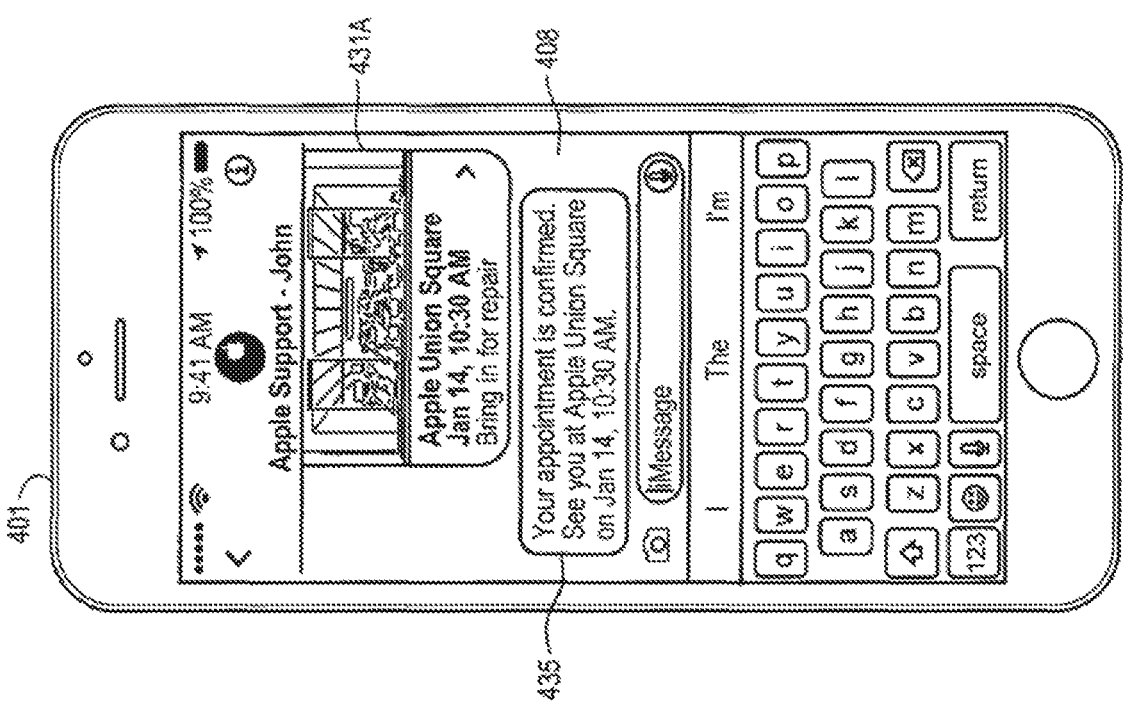
FIG. 7M
FIG. 7N

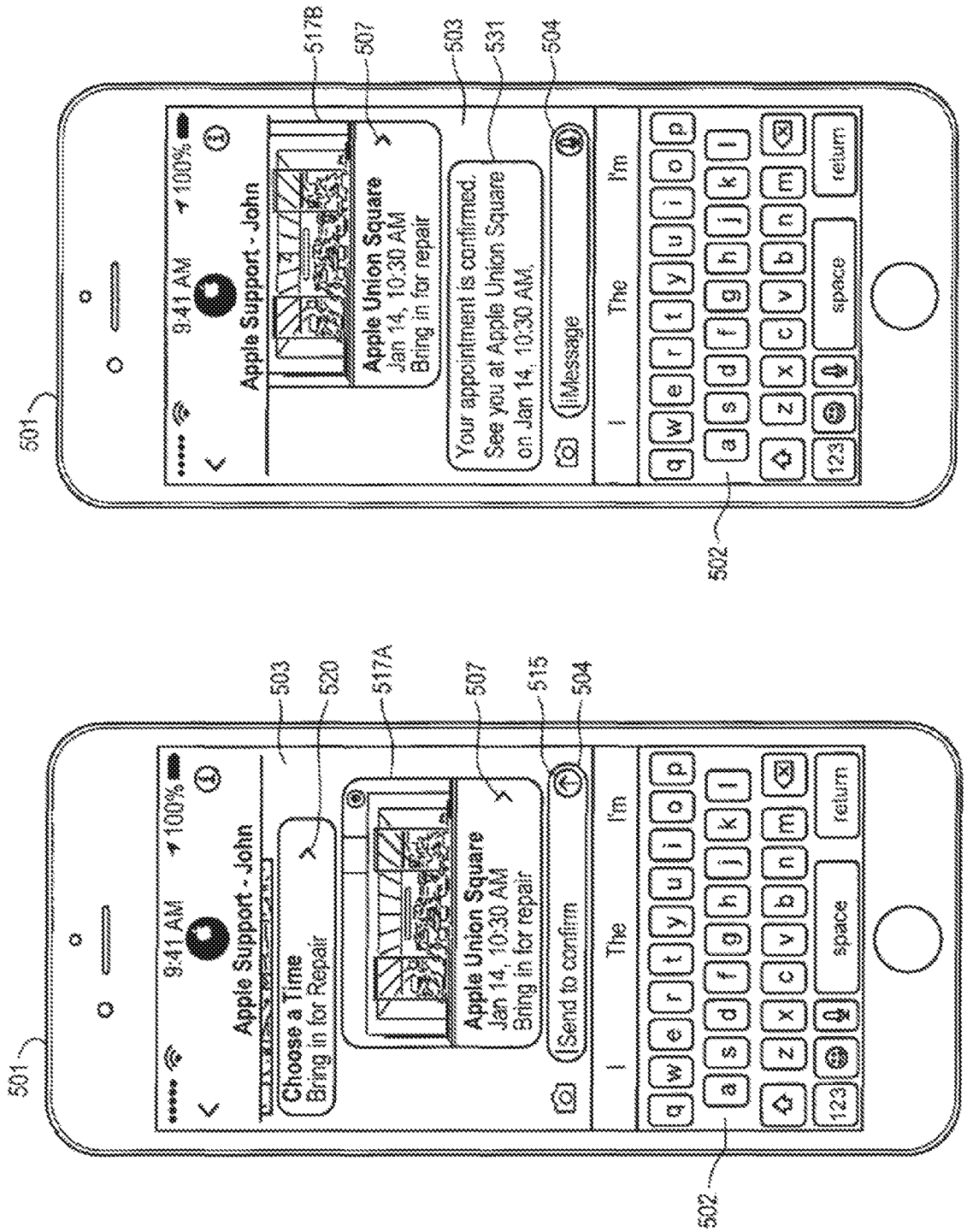

INITIATING A BUSINESS MESSAGING SESSION

CROSS-REFERENCE TO RELATED APPLICATIONS

The present application is a continuation of U.S. patent application Ser. No. 16/428,897 entitled "Initiating a Business Messaging System," filed on May 31, 2019, which is a continuation-in-part of U.S. patent application Ser. No. 15/721,571 entitled "Messaging System for Organizations," filed on Sep. 29, 2017, which claims the benefit of U.S. Provisional Patent Application No. 62/507,163, filed May 16, 2017, the entirety of each of which is incorporated herein by reference for all purposes.

TECHNICAL FIELD

The present description relates generally to business messaging, including initiating a business messaging session.

BACKGROUND

The use of text messaging systems began many years ago. For example, wireless cellular telephone carriers allowed text messages through the Short Message Service for cell phones in the 1990s before smartphones were available. Typically, the amount of data transmitted for SMS messages has been limited by rules established by the carriers. Recently, as the use of smartphones and tablet computers has increased, the messaging systems have developed the ability to send images, such as photos or emojis or videos. In addition, messaging systems have allowed users to also send and receive text and images through "public" networks which include "public" WiFi access points (e.g., at airports, coffee shops, etc.) and the Internet (in addition to using a wireless carrier's cellular telephone network).

BRIEF DESCRIPTION OF THE DRAWINGS

Certain features of the subject technology are set forth in the appended claims. However, for purpose of explanation, several embodiments of the subject technology are set forth in the following figures.

FIG. 4 shows an example of fields which may be included in a registration database according to one or more embodiments described herein.

FIG. 5 shows an example of a client device which can be used by a customer or user of a business according to one or more embodiments described herein.

FIGS. 7A, 7B, 7C, 7D, 7E, 7F, 7G, 7H, 7I, 7J, 7K, 7L, 7M, and 7N show an example of a messaging session between a customer and a business according to one embodiment described herein.

FIGS. 9A, 9B, 9C, 9D, 9E, 9F, 9G, 9H, and 9I show another example of a messaging session between a customer and a business according to one embodiment.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

The various embodiments described herein relate to messaging systems such as text messaging systems or "chat" messaging systems or other systems which allow devices to communicate messages between the devices. Typically a messaging system includes a plurality of client devices, each including at least one messaging application and a set of one or more messaging servers that can receive messages from client devices and transmit messages to other client devices. A client device can be a communication device such as a smartphone, or tablet computer, or a desktop computer or a laptop computer or a wearable device, or an onboard computer, or other data processing systems or other consumer electronic devices. In one embodiment, the client device can include a conventional touchscreen that can both display images and also accept touch inputs from a user. The touch screen on the communication device can display the user interface of the messaging application which can include a message transcript and an on-screen keyboard below the message transcript. In addition, the user interface of the messaging application can include a username indicating the recipient, in one embodiment, of messages sent from the communication device during a messaging session. In addition, the user interface can include a text entry region which indicates the content of the text entered by the user before it is sent; in a sense, the text entry region is a text staging area indicating text that is ready to be sent to the recipient. Examples of various user interfaces for messaging applications are provided herein, such as, for example, FIGS. 7A through 7N as well as other figures.

Figure 3:
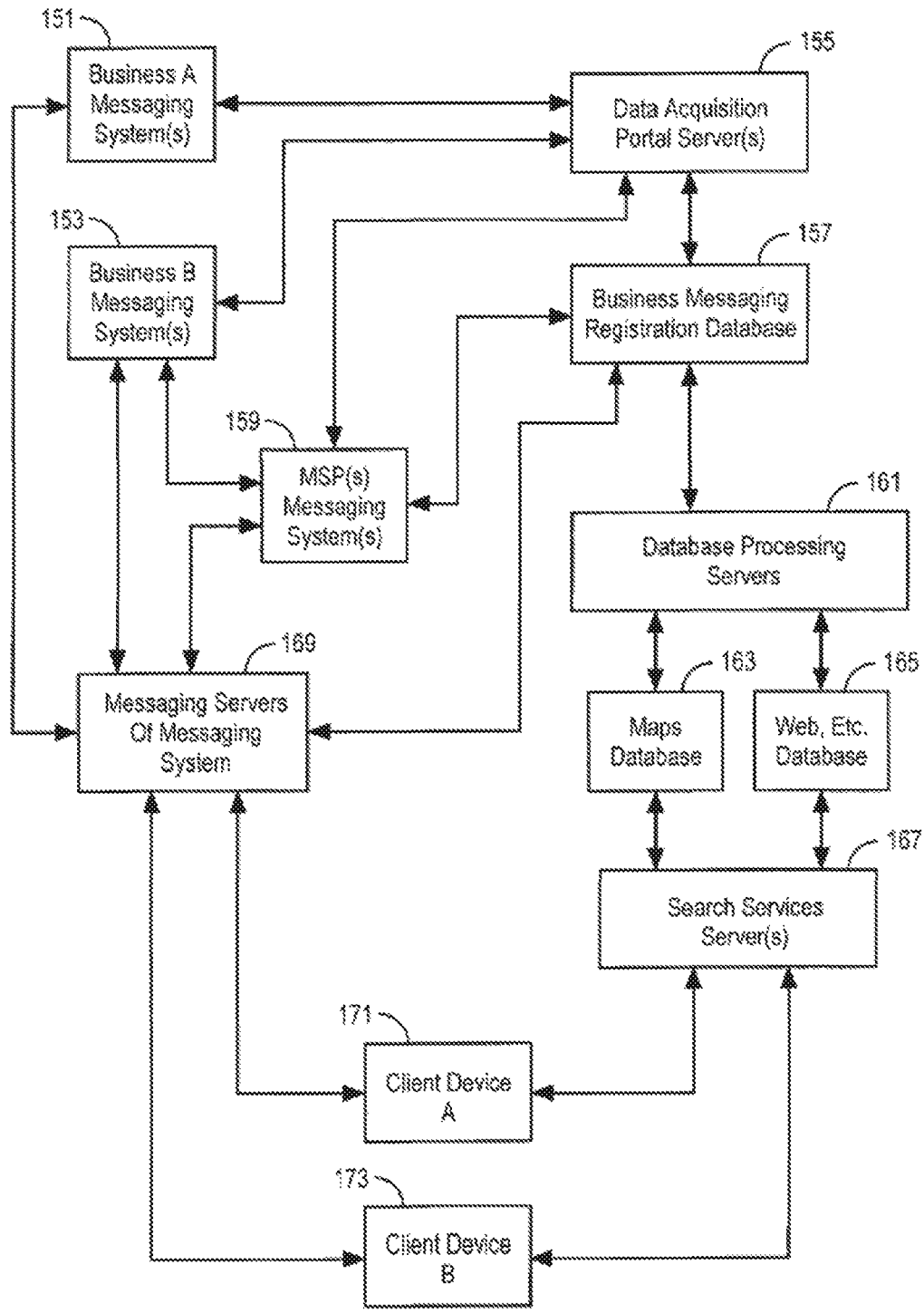
FIG. 3 shows an example of a messaging system which includes a plurality of client devices which can be operated by customers of businesses and which engage in messaging sessions with those businesses through the messaging servers after the businesses have established a messaging account.

FIG. 3 shows an example of a public messaging system that is extended to include businesses which register for messaging services through the same messaging system that supports members of the public. In one embodiment, each member of the public uses or owns a device configured with at least one messaging application to communicate with other similar devices through one or more messaging servers that are designed to allow the communication of messages between client devices or between a client device and a device operated by a business. In one embodiment, the messaging may be near instantaneous for users who are both online and active at the time of a messaging session. In a typical messaging system, there can be millions of client devices communicating through a set of messaging servers and the messages (and attachments) can be encrypted using techniques known in the art. The messages can include rich content such as images, videos, animated content, etc. In one embodiment, one set of servers can receive and transmit text messages and another set of servers can be configured to receive non-text content, such as images or other attachments and provide those images or attachments in download operations to receiving devices in response to requests from those receiving devices to obtain the images or attachments. In the example shown in FIG. 3, client devices 171 and 173 may be smartphones, speakers with computing capability, or laptop computers with displays, any mixture of those, or other communication devices that are configured with one or more messaging applications to communicate with one or more messaging servers 169 which are part of a messaging system. The messaging servers 169 can be part of a messaging system that can also include one or more identity servers and one or more servers for cloud based storage for temporary storage of messages (for delivery of messages to devices that were offline when a message was sent) and long term archival storage of messages and other related content such as attachments to the messages. The identity servers can register user devices and provide storage for identification and cryptographic information for each user device; for example, the identity servers can store one or more public keys for each user and tokens used to push messages, through the messaging servers, to designated recipients of the messages. Further information about a messaging system that includes messaging servers, identity servers and cloud storage can be found in U.S. Provisional Patent Application No. 62/466,325, filed Mar. 2, 2017, which application is incorporated herein by reference. As described further herein, the messaging system can also include systems (at one or both of the user client devices and the servers in the system) to manage settings or preferences for messaging sessions.

In the embodiments described herein, the messaging system can be extended to include businesses or other organizations which register with the registration service through, for example, a data acquisition portal server 155 which can be one or more servers that serve as a portal to acquire data from businesses or other organizations which seek to register for a messaging service for businesses. In the example shown in FIG. 3, a business messaging system 151 and another business messaging system 153 can each be used, to both register for a business messaging service and also perform the operation of conducting messaging sessions with customers or users of the business. In addition, one or more messaging services platform (MSP) can also register to act as a helpdesk or surrogate for a business that is registered to conduct messaging sessions through the messaging system such as the messaging system shown in FIG. 3. For example, the messaging services platform can include one or more messaging systems 159 which can be laptop computers or smartphones or other devices configured to conduct messaging sessions as a helpdesk or surrogate for one or more businesses which have registered to conduct messaging sessions through a selected MSP. The messaging system operated by a messaging service can also include a business messaging registration database 157 which receives information to establish business messaging accounts through the data acquisition portal server 155. As described further below, at least some of the data from the business messaging registration database 157 can be provided to one or more data processing servers 161 which update one or more searchable databases with information from the business messaging registration database 157 as described further below. In one embodiment, these one or more searchable databases can include at least a maps database 163 and another database 165 which store information which can be searched by one or more search services servers 167 in response to search queries from one or more client devices, such as client devices 171 and 173. In an alternative embodiment, the databases 163 and 165 can be combined together into one database or be separated into more than two databases. The search services servers can also provide auto completion or auto suggestions for search inputs in one embodiment.

Figure 1:
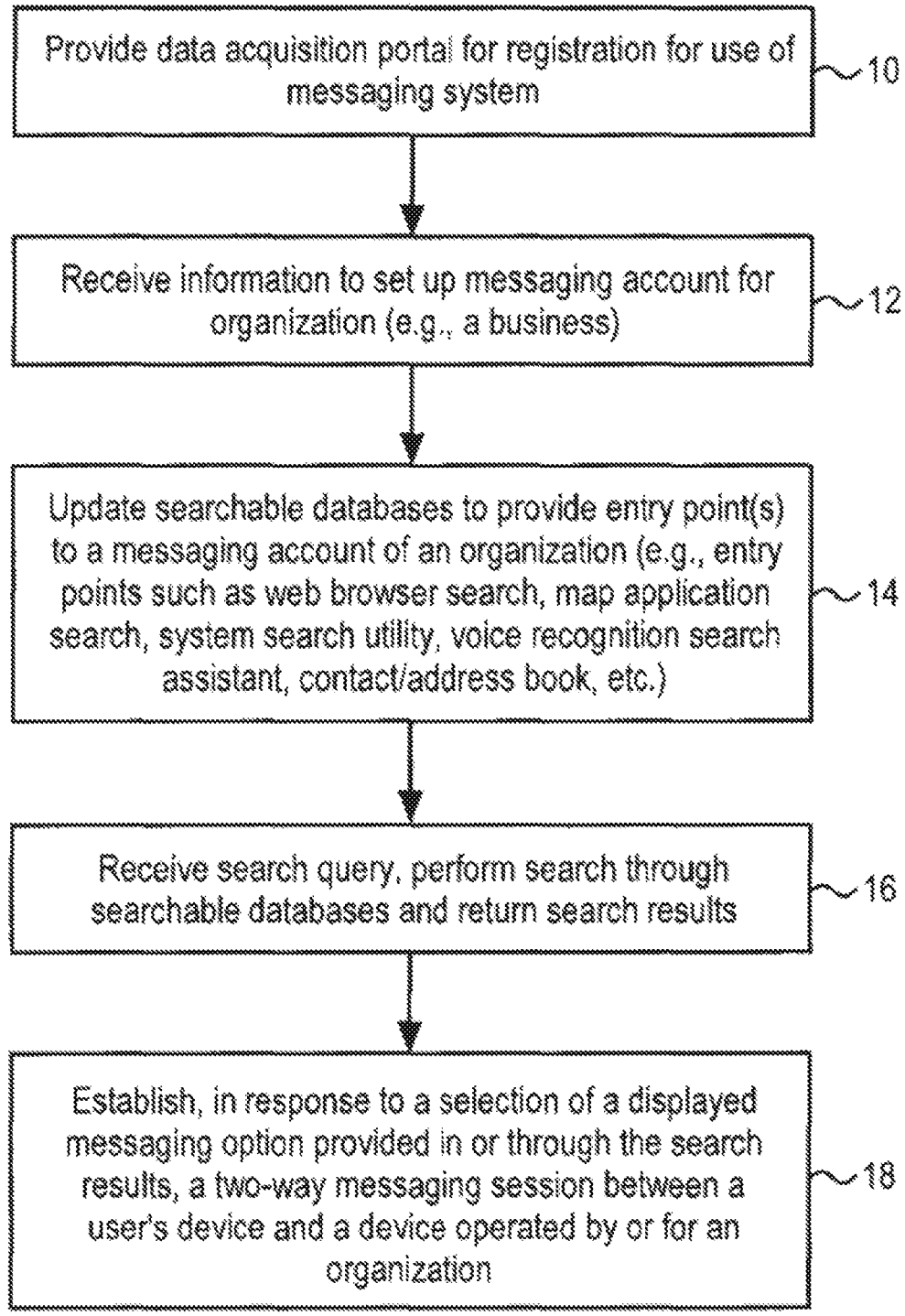
FIG. 1 is a flowchart which illustrates a method which can be performed by a messaging system according to one or more embodiments described herein.

FIG. 1 shows an example of a method which can be performed by a messaging system. Reference is made to a non-limiting example of a messaging system of FIG. 3. Messaging system controls one or more messaging servers 169 as well as the data acquisition portal server 155 and the business messaging registration database 157 and the data processing servers 161 and the search services service servers 167 according to one embodiment. Such a messaging service can already provide messaging services for members of the public who own or use devices configured to operate with the messaging servers 169 to exchange messages, such as text messages and messages containing images and other content with other users who own devices or use devices that are configured to also operate with such messaging servers. In operation 10, a messaging service can provide one or more data acquisition portals for registration for the use of the messaging system. In one embodiment, these portals can be provided as webpages hosted by one or more data acquisition portal servers 155, and these webpages can provide one or more forms which can be completed by a business entity or other organization to provide information which is used in the registration process to create a messaging account for a business. For example, a messaging system 151 owned or controlled by business A can be used to access webpages provided by the data acquisition portal server(s) 155, and such systems 151 can provide information in connection with a new or updated business messaging account to be used by business A which controls or operates the one or more messaging systems 151. Similarly, one or more messaging systems 153 owned or operated by business B can access the one or more data acquisition portal servers 155 to enter information requested or required by the messaging system in order to enroll the business in a messaging account for a business. Similarly, one or more messaging services platforms (MSP), such as the MSP messaging systems 159 shown in FIG. 3, can also provide registration information to a messaging system in order to enroll the MSP service provider which can act as a helpdesk or surrogate for other registered businesses which request that the MSP provide helpdesk or other services to the registered business. In one embodiment, the business B can elect to use an MSP to provide helpdesk support for business B. The information requested or required by the registration process, which can be performed by one or more data acquisition portal servers 155, can include a variety of different information, such as company name, addresses, phone numbers, business type identification, company contacts, URLs, brand information, location information, customizable fields, brand authorization information, limitations on initiation of new messaging sessions based on the amount of current messaging sessions, etc. Such information which can be requested or required for registration of a messaging account for a business is described further below in conjunction with FIG. 4, which provides an example of various fields which can be required or requested in the process of a registration to create a business messaging account. The information provided by a business entity or other organization during the registration process is received in operation 12 shown in the method of FIG. 1, and this information can be stored in a business messaging registration database, such as the business messaging registration database 157 which can be coupled to the one or more data acquisition portal servers 155 as shown in FIG. 3.

After the registration information is stored in the registration database 157, at least a portion of that information can be provided to one or more database processing servers, such as the servers 161 in order to perform operation 14 in FIG. 1, which involves updating one or more searchable databases to provide at least one entry point to a messaging account of an organization such as a business. In one embodiment, multiple searchable databases can be updated with the information from the registration database 157. In one embodiment, some but not all of the information in the registration database 157 is provided to the one or more searchable databases. Certain information may not be provided, such as information indicating limitations on the amount of concurrent or new or active messaging sessions or other message information or other registration information provided by a business during the process of registration for a business messaging account. Operation 14 shown in FIG. 1 can update a map database, such as map database 163 and other databases such as one or more databases 165, which can include information about websites, media content such as songs, movies, books, etc., encyclopedias, and current news or other news information, and information about social media (e.g., Twitter) and social media accounts, etc. Further information in connection with the other databases 165 can be found in pending U.S. patent application Ser. No. 14/503,138 filed on Sep. 30, 2014, and pending U.S. patent application Ser. No. 14/503,226 filed on Sep. 30, 2014; these applications are incorporated by reference herein. The updating of one or more searchable databases with information from the business messaging registration database allows client devices to search for information about various businesses on their devices and obtain information about those businesses as a result of such searches. In one embodiment, the search results themselves can provide a selectable business messaging option which the user can select in order to initiate a messaging session with the selected business. In another embodiment, the selection of a messaging option in a search result for a business can provide contact information on a separate sheet or page or card displayed on the system before the user invokes a messaging system, and such information can include alternative mechanisms for contacting the business, such as email, telephone numbers, street addresses, and other information which can be used as an alternative to a messaging session. In one embodiment, the one or more searchable databases can provide multiple entry points to a messaging session with an organization, such as a business. For example, these entry points can include entering a messaging session from a search results page of a web browser search or entering a messaging session through the selection of a messaging option on a search result page from a search conducted in a map application, or entering a messaging session through the selection of a messaging option on a search result page from a system search utility, such as an operating system wide search utility. Other entry points to a messaging session with an organization which has an established business messaging account can include search results from a search using a maps application or service, contacts or address book application or service, a voice recognition search assistant. The updating of the searchable databases can include the entry of a plurality of data from the registration process, such as at least some of the data shown in FIG. 4 for a particular business, and this information can then be searched for by one or more users and the results of these searches can bring up information about the business, including a selectable user interface icon such as a messaging option icon displayed on a screen of a user device which can allow the user to select the icon to launch a message session with the business.

After one or more businesses or other organizations register for business messaging accounts and their information is updated into the one or more databases, searches can be performed on that information to yield search results which include a selectable messaging option that can be selected by a user to invoke or initiate a messaging session with a business or other organization. In one embodiment, the initiation of a messaging session can begin through search results provided in response to a search query which can be received in operation 16 by the one or more search services servers 167 which can be part of the same system owned or controlled or operated by the messaging service which provides the one or more messaging servers 169. The search results can be obtained after a search through the one or more searchable databases, such as databases 163 and 165 and the results from these searches can be returned to the client device and displayed on the client device in a user interface, such as the user interfaces shown in FIGS. 6A and 6B. As described further below, these search results can be filtered or processed to determine whether or not to display messaging options with the search results. A user can then select one of the displayed messaging options (e.g., a chat or messaging icon) corresponding to a messaging account of a business or other organization in order to initiate and establish a two-way messaging session between the user's device and a device operated by or for the business or organization as shown in operation 18 in FIG. 1. In one embodiment, the business or organization can include an initial response which indicates an estimated wait time or estimated response time to the user's initiation of the messaging session.

In one embodiment, the messaging session may not occur if the business has imposed a limitation on the amount of messaging sessions that can be initiated or concurrently maintained or established with the business or organization. The number of existing messaging sessions already in progress with the business can be compared with a threshold set by the business to determine whether to restrict new messaging sessions before they are initiated; if the number of existing messaging sessions exceeds the threshold, then new messaging sessions can be throttled so they are not initiated, while if the number of existing messaging sessions is less than the threshold, the new messaging sessions are not throttled and can be initiated. Further, other aspects such as recency in time of a messaging session can also be taken into account when deciding whether to throttle the initiation of new messaging sessions with the business. For example, the business or organization may impose a limitation based upon whether the user is active or inactive, which can be a binary decision based on, for example, recency of contact or messaging if the user has recently engaged in a messaging session with the business. For example, if the business decides to impose such a limitation then the most recent messaging session can be evaluated for recency to determine whether it is recent enough to be considered active. If it is too old or stale then the user may be characterized as an inactive user and may not be able to establish a messaging session if too many messaging sessions are already in progress at the current time (relative to a threshold value set by the business) with the business organization. In another embodiment, multiple values based on recency or other criteria, such as purchases or amount of purchases or other criteria may be used to determine whether the user is given immediate or delayed access to a messaging session with the business. In another embodiment, if a user closes a conversation, the business or organization can receive a message indicating such closure and cause the user to be moved to an inactive status. Other techniques for limiting access by "inactive" users or customers of a business during heavy messaging traffic can be used to throttle the number of concurrent messaging sessions for a business in order to ensure adequate support for customers of a business for the most active users or customers of the business.

Figure 6A:
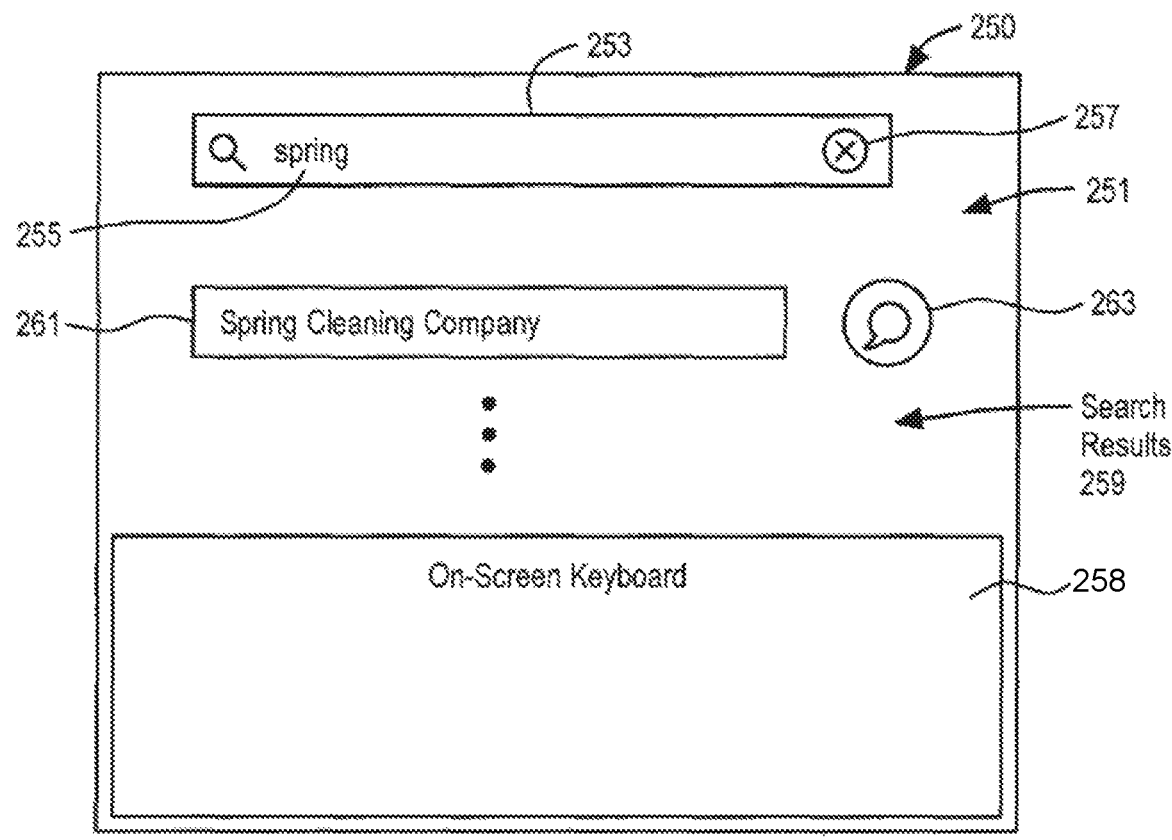
FIG. 6A shows an example of an entry point for beginning a messaging session with a business through the use of search results displayed on a client device operated by a customer of a business having a messaging account.

In one embodiment, the search results that are returned (e.g. search results returned in operation 16 of FIG. 1) can be filtered or checked against conditions (e.g., limitations to throttle initiation of messaging sessions for a business) or other criteria that are evaluated to determine whether or not to display, in the search result, a messaging option (such as messaging option 263 shown in FIG. 6A). The filtering or checking can occur prior to returning (e.g. transmitting) the search results to a client device or can occur after transmitting the search results, and one or both of the search server (or other servers) and client device can perform the filtering or checking. The conditions or other criteria can include (1) business factors; or (2) user specific factors; or (3) messaging service factors. The business factors can include one or more of (a) the current time is outside of a specified time period in which the business conducts messaging sessions (e.g., local current time is 3:00 am and the business is closed) or (b) the business has communicated a signal to the messaging service to not initiate new messaging sessions; or (c) specified limitations for throttling initiation of new messaging sessions are currently exceeded, where the limitations can be specified in the business's account information and the throttling can be automatically performed by not showing a messaging option for the business in the search results when the limitations are exceeded for the business. The user specific factors can include a requirement for authorization data which validates that a user device is authorized to conduct a messaging session with the business; the business can require such data when the business is, for example, in a test mode and wants to limit access to its messaging sessions to only authorized users (e.g. employees of the business). The messaging service factors can include a setting used by the messaging service to stop a business's use of the messaging service (e.g., the business engages in illegal activities and a government body requests the messaging service to cease providing messaging sessions for the business).

In one embodiment, the messaging session for a business may be performed by a surrogate, such as a messaging services platform (MSP) that can act as a helpdesk or surrogate for a business or organization in order to conduct messaging sessions; for example, a messaging services platform can act as a helpdesk for a business and respond to messages from customers or users of the business and hence act as a surrogate for the business. In one embodiment, the account information specified by a business during the business registration process to establish a business messaging account can include information which specifies one or more messaging services platforms that can act as a helpdesk or surrogate for the business for the purposes of conducting messaging sessions with customers or users of the business or organization. In one embodiment, the MSP can register the business with the messaging service and can generate an API (Application Programming Interface) prefix for the MSP and a set of publically accessible http endpoints so that the MSP can conduct messaging sessions on behalf of the business. Further details of one particular embodiment for using MSPs are provided in the Appendix.

In one embodiment, some or all of the account information can be stored on a message registry stored on one or more servers by the messaging system and/or a messaging identification system that uses one or more messaging identifiers of an organization or business in order to initiate a messaging session. In one embodiment, the messaging identification system can include one or more identification servers that receive identification information from a messaging application on a device, and this messaging identification information can be used to determine the account associated with the device and other information associated with the device in order to establish a messaging session with the device and another device which is also configured to operate with the messaging system. In one embodiment, a messaging session can be established by the message identification system providing connection information about one or more devices of a business in order to allow a user or customer of the business to establish a messaging connection with the system of the business. In one embodiment, the connection information can include one or more push notification tokens that are used by each device in the messaging session in order to allow push messages to be conveyed to recipient devices during a messaging session.

In one embodiment, a business or organization can embed information within the messages during a messaging session, such as embedded data specifying a purpose or intent for the message and other embedded data such as embedded data specifying a group or location within the business which is responsible for receiving and sending messages during a messaging session with a customer or user of the business or organization. The data specifying a purpose or intent for the messages can be a way for the business or organization to characterize or categorize a topic or purpose for a messaging session. Several examples are provided herein for such topics or purposes in order to allow the business or organization to route the messaging session to the appropriate people within a business organization in order to conduct the messaging session properly. For example, the data specifying a purpose or intent may specify that the messaging session is in connection with a repair for a customer or user of the business or may specify that the purpose or intent of the messages in a particular messaging session relates to an order status or other transaction in connection with the business or organization.

Figure 2:
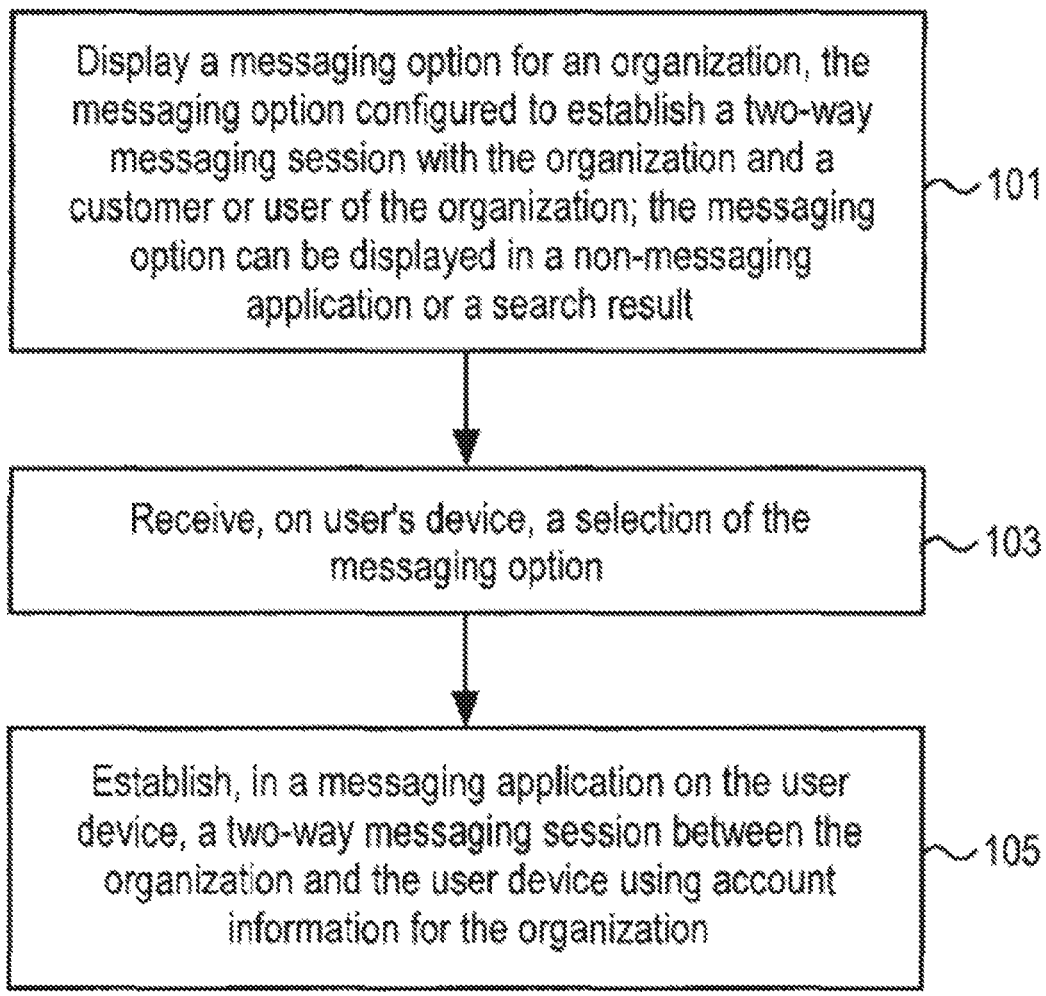
FIG. 2 is a flowchart which illustrates a method which can be performed on a client device or user device which is in communication with one or more messaging servers.

A method which can be performed by a client device, such as client device 171 or 173 shown in FIG. 3, will now be described while referring to FIG. 2. In operation 101, a client device can display a messaging option for an organization such as a business and this messaging option can be selected by a user and, when selected, it can establish a two-way messaging session with the organization and the user's device which displays the messaging option. In one embodiment, the messaging option can be displayed in a non-messaging application or within a search result such as the examples shown in FIGS. 6A and 6B. In one embodiment, the messaging option can be a chat or messaging button which a user can select to initiate the messaging session. Examples of such displayed messaging options include messaging option 263, shown in FIG. 6A, messaging option 313 shown in FIG. 6B and messaging option 404 shown in FIG. 7B. When the messaging option is selected by a user of a client device, the messaging application can use information associated with the messaging option, including, for example, a messaging identifier for use by a messaging identification system which can be used to specify or obtain the appropriate messaging connection information in order to establish the messaging session with an organization such as a business. In one embodiment, the messaging identifier can specify a cloud storage account for sending, receiving and storing messages. When a messaging option is selected in a non-messaging application, a call to the messaging application can be generated and can include the messaging identifier for use by a messaging identification system in order to establish the messaging session with the organization. This call can occur in response to receiving on the user's device, a selection of the messaging option, which is shown as operation 103 in FIG. 2. In response to that selection, the user's device, such as client device 171 or client device 173 establishes, in a messaging application on the user device, a two-way messaging session between the organization and the user device using account information for the organization. In one embodiment, the organization can then provide as an immediate or near immediate response, an estimated response time or wait time, and examples of such estimated response time or wait time are provided further below. In one embodiment, the two-way messaging session can last for an extended period of time and be stored in a transcript of the conversation over that extended period of time, and the transcript can be stored on the user's device and on one or more devices operated by the organization. The conversation with the organization can be displayed in a list of conversations on the user device, and that list can include conversations with other users who are not businesses. Moreover, the conversations in the list can be archived (e.g. in cloud storage) and be synchronized across different devices of the same user. Thus, a customer of a business can, through a user's device, initiate a messaging session with the business on Monday and then turn off the user's device, and then resume the messaging session two days later on the same or different user device and then resume the messaging session again on the following Monday (on the same or different user device) with the entire set of messages stored in the transcript that defines the conversation with the business.

FIG. 4 shows an example of various data fields which can be used during a registration process in which a business sets up a messaging account through the use, for example, of a data acquisition portal server, such as the one or more data acquisition portal servers 155. In one embodiment, a representative of the organization such as a business can use a web browser to get access to the portal, which can then present the various data fields to allow someone to enter data into those fields as part of the registration process to obtain a business messaging account. While some of the information may be required other information can be optional, such as whether the business wants to use a messaging service platform (MSP), or whether the business wants to specify locations or use customizable fields or wants to specify brand authorization or wants to specify limitations on the amount of concurrent messaging sessions for the business. Some of the information required by these data fields can include company name, one or more addresses for the company, one or more phone numbers, a specification of one or more business types that the business engages in, one or more company contacts and one or more URLs. The business may also specify brand information such as a logo or name which can be a trademark or service mark of the business in one embodiment. If the business desires to use an MSP as a helpdesk or surrogate to receive and respond to messages with customers or users of the business, then the business can specify or select one or more messaging service platforms to serve as a helpdesk or surrogate for the business. If the business has one or more physical locations which can be a store or other facility, the business can also specify those locations including the name of the location, the address of the location, one or more phone numbers, the hours of business in which the business is open and available to service customers, one or more URLs, etc. The data fields may also include one or more customizable fields that can be specified by a business and used in certain messaging sessions. The data fields used in the registration process can also include information in connection with brand authorization indicating the brands that the business is authorized to carry or sell in one embodiment. Further, one or more of the data fields in the registration process can include fields designed to accept configuration data specifying limitations on the amount of concurrent messaging sessions for the business and this data can be used to throttle the initiation of new messaging sessions for the business. These limitations can take a variety of different forms and can be based upon whether or not a user is considered active or inactive. In one embodiment, the limitation may be a binary on or off limitation that defines users or customers as active or inactive. Active users or customers may be defined as those who have conducted a messaging session with the business in the last, for example, six months. In other words, the characterization of a customer or user as active or inactive can be based upon recency of a messaging session in one embodiment. In other embodiments, the characterization of a business user or customer as active or inactive can be based upon other criteria, such as the number of purchases or the amount of purchases in a currency value, etc. In one embodiment, the limitation can be dynamically adjusted over time by the business entity modifying settings in the business's messaging account and changing one or more values in the messaging account with respect to these limitations.

FIG. 5 shows an example of a client device 201 which can include a plurality of different software applications that can execute on the client device 201 and that can be used as an entry point into a messaging session provided by a messaging application, such a messaging application 217 shown in FIG. 5. For example, the client device 201 can include a web browser 203, one or more user applications 205, a map application 207, a system search utility 209, a search recognition assistant 211, an email application 213 and the messaging application 217. Other applications on client device 201 that can provide an entry point into a messaging session can include: a contact/address book application; a dialer application; a wallet application; or a QR code application that receives an image and processes the image to extract a request to initiate a messaging session with a business. The user of the client device 201 can enter search queries into the web browser 203 or the map application 207 or the system search utility 209 or the search recognition assistant 211, and in each case search results can include one or more messaging options which can be selected by a user to initiate or establish a messaging session with a business which has established a business messaging account as described herein. In one embodiment, the selection of the messaging option may immediately invoke the messaging application 217, causing the messaging application to appear and causing an initial response from the business to initially appear either immediately or nearly immediately. In the case of the system search utility 209, the search may be performed through local searchable content 219 which can be indexed full-text content stored on the client device 201, as well as indexed metadata stored on the client device 201, and further information in connection with such a system wide search utility can be found in U.S. Pat. No. 7,437,358 which is hereby incorporated herein by reference. In addition, the system search utility 209 may also cause a search of remote content such as a search of the maps database 163 and a search of the database 165 which can include text content and content such as images, songs, movies, etc. The searching of the database 165 to provide content back to the client device through the system search utility 209 can be implemented using one or more of the embodiments described in the following published U.S. patent applications which are hereby incorporated herein by reference: U.S. patent application Ser. No. 14/503,138 filed on Sep. 30, 2014, and pending U.S. patent application Ser. No. 14/503,226 filed on Sep. 30, 2014. In one embodiment, the selection of the messaging option can cause the display of a business card or contact sheet or other contact information for a business prior to initiating or establishing a messaging session with the business; this can be done to allow the user to browse the contact information before engaging in a messaging session to ensure the user has selected the appropriate business. FIG. 11C shows an example of contact data which can be displayed either prior to the initiation of a messaging session or during a messaging session with the business. In one embodiment, both the system search utility 209 and the search recognition assistant 211 can search both the local searchable content 219 as well as the remote databases, such as database 163 and database 165. Further, in one embodiment, the web browser may also search the maps database 163 and the database 165 when performing a search based upon a search query entered into the web browser 203. The applications 205 can be, for example, an application provided by the business which includes a messaging option such as a chat button which can be selected by the user to initiate a messaging session with the business.

In one embodiment, a business may also send an email to a client device which can then be displayed by an email application on the client device, such as email application 213, and this email can include a messaging option such as a chat button or messaging button within the email. The messaging option within the email can be selected by the user, which can then cause the initiation or establishment of a messaging session with the business.

FIG. 6A shows an example of a set of search results, which can be provided by, for example, a search by the web browser 203 or a search by the system search utility 209 or a search by the search recognition assistant 211 in one embodiment. The window 250 includes a text entry field 253 which shows the entered text 255 which was entered by the user as the search query. The user can delete the entered text by selecting the delete button 257 and enter new text into the text entry field 253 to cause a new search to be performed. The text can be entered through an on-screen keyboard, such as on-screen keyboard 258 shown in the lower portion of window 250 in FIG. 6A. The list of search results 259 can include a search result 261 for a particular business which has established a business messaging account according to one or more embodiments described herein. The search result for that business includes a messaging option 263 which can be also referred to as a chat button. In one embodiment, messaging option 263 is not displayed in the search result if the one or more limitations on the number of messaging sessions with the business causes throttling of the initiation of new messaging sessions. If the user selects the messaging option 263 by, for example, touching or tapping or clicking the messaging option 263, then a messaging session can be initiated and established with the business associated with that messaging account. In this case the business is known as the "Spring Cleaning Company" as shown within the search results 259.

Figure 6B:
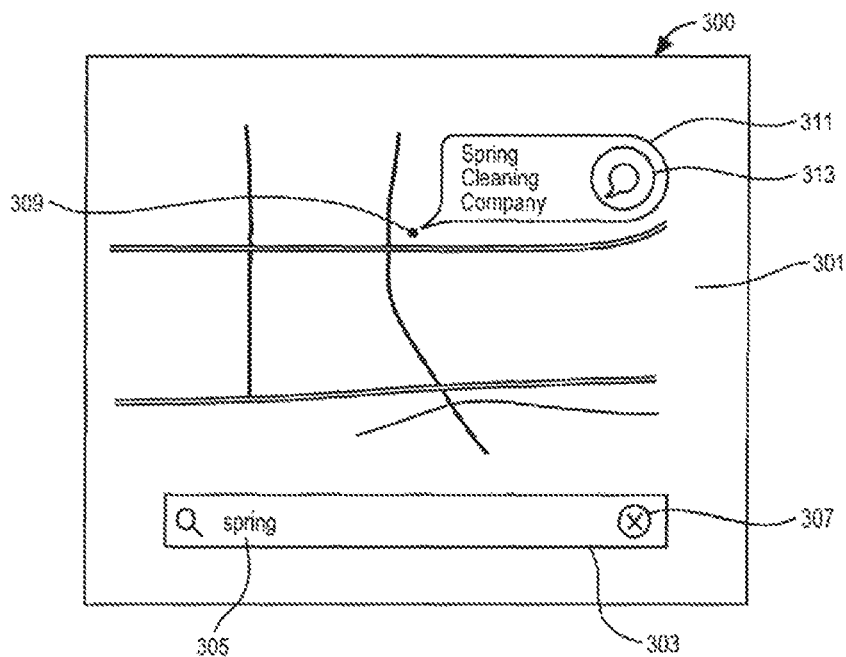
FIG. 6B shows another example of an entry point into a messaging session according to one embodiment.

FIG. 6B shows an example of search results from a map application, such as map application 207. A map is displayed by the map application within window 300 and the user has selected a particular location 309 which is associated with a business that was found by the search performed by the map application 207. The search input shown as entered text 305 appears within the text entry field 303, and the user can invoke a new search by selecting the delete button 307 and entering new text into the text entry field 303. In the example shown in FIG. 6B, the user has selected the location 309 which is the location for a business known as the "Spring Cleaning Company" as shown by the information bubble 311, which is associated with the location 309 shown on the map within window 300. The information bubble 311 includes a selectable messaging option 313 which the user can select to initiate a messaging session with the company associated with the messaging account established by the "Spring Cleaning Company" through the one or more embodiments described herein. Selecting the messaging option 313 can immediately invoke or launch a messaging application, such as messaging application 217, or in an alternative embodiment, a contact sheet or other contact information or business card of the business can be displayed prior to initiating or launching the messaging application. In one embodiment, the messaging option 313 is not displayed in the map or the information bubble 311 if the initiation of new messaging sessions has been throttled by limitations set by the business.

In addition to performing a search and showing search results that include one or more chat buttons, a speech recognition assistant can also recognize a user's spoken request to either initiate or resume a messaging session with a business. For example, a user can speak "send a message to Spring Cleaning Company" and the speech recognition assistant can recognize this spoken phrase as a request to initiate a messaging session (if not previously established) or resume a previously established messaging session.

Figure 7B:
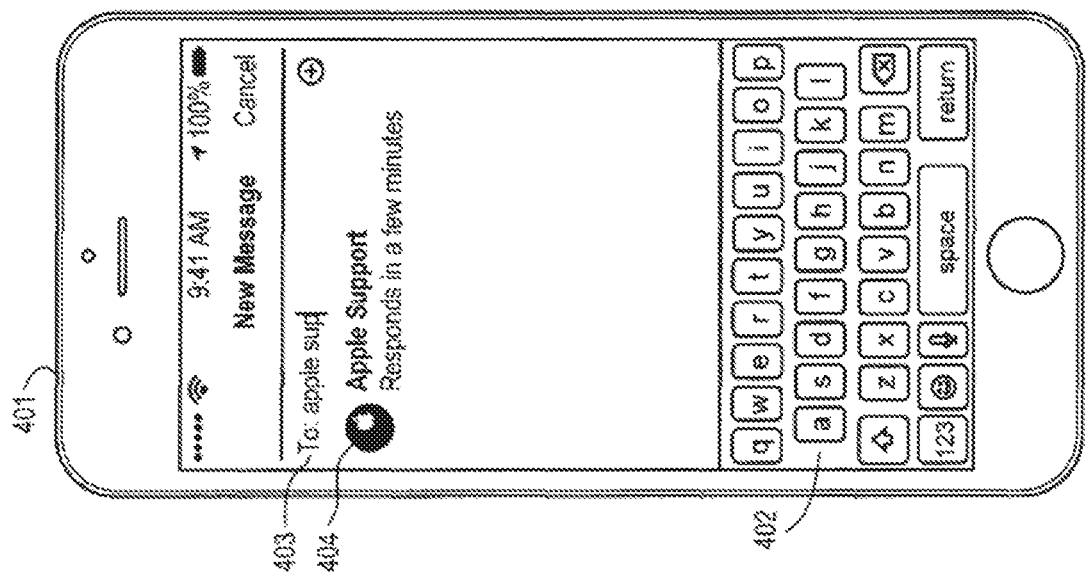
Figure 7A:
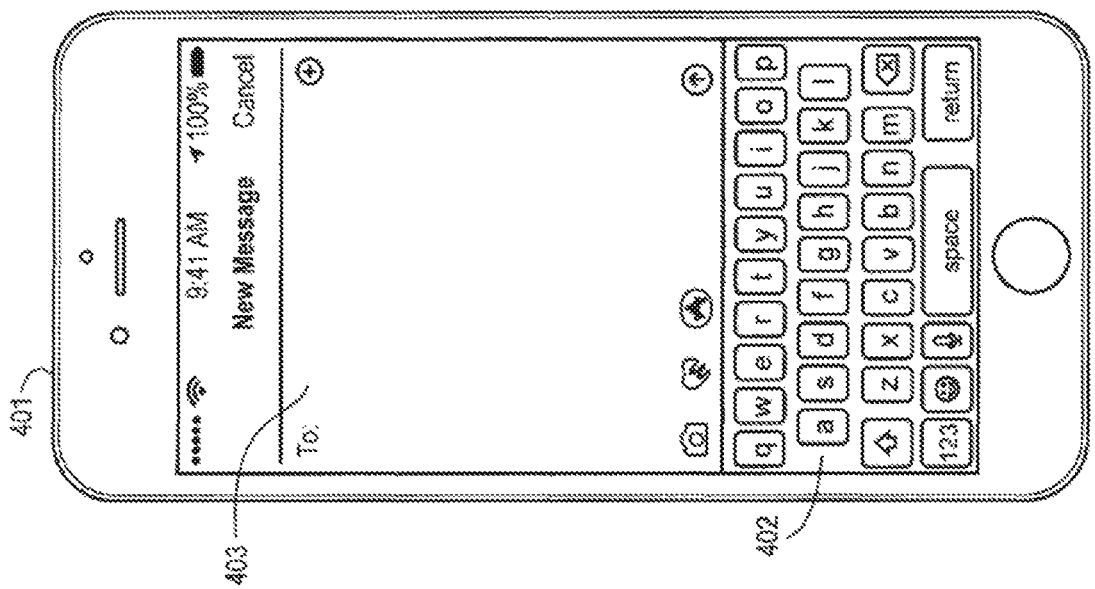
Figures 7C, 7D:
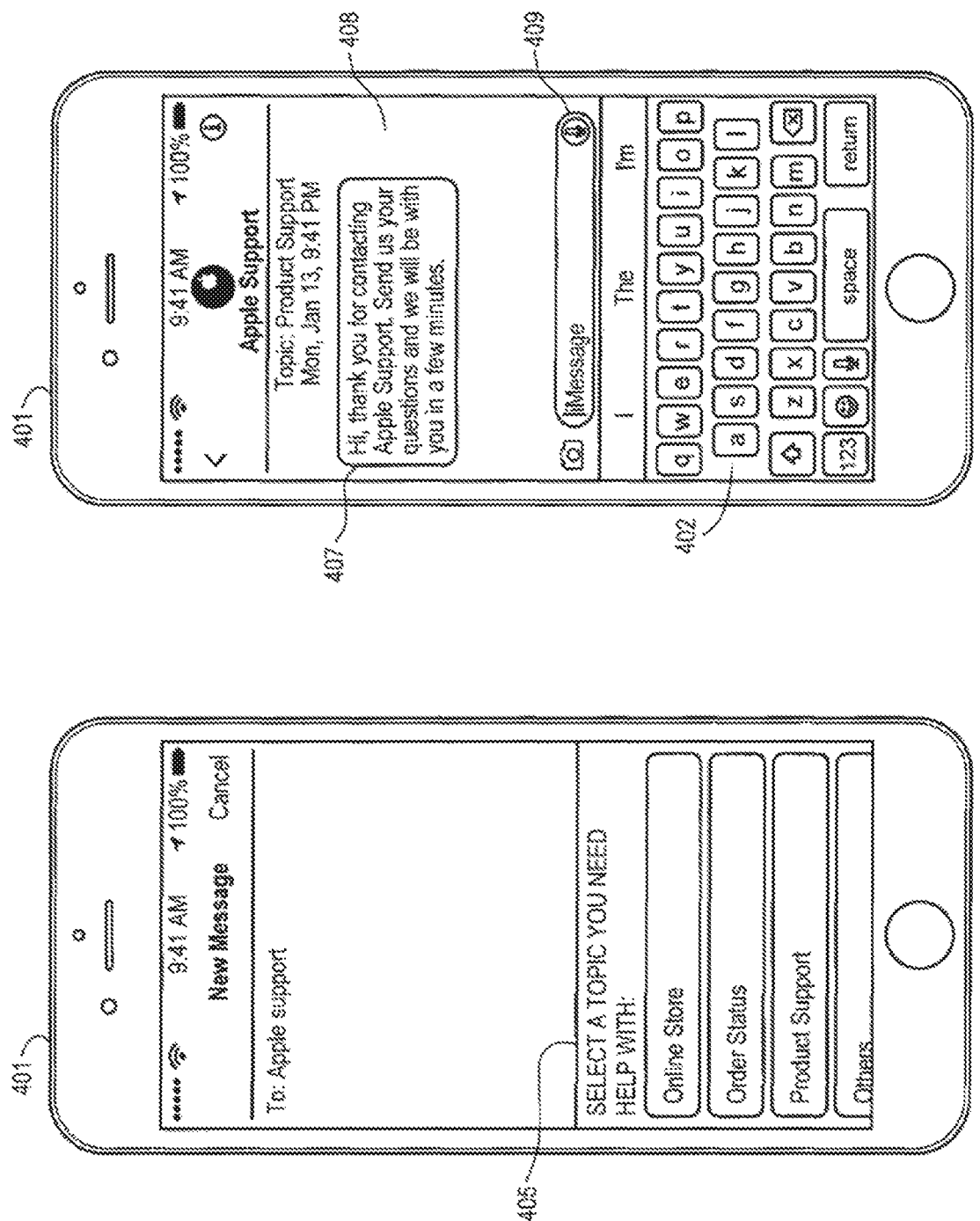
Figure 7F:
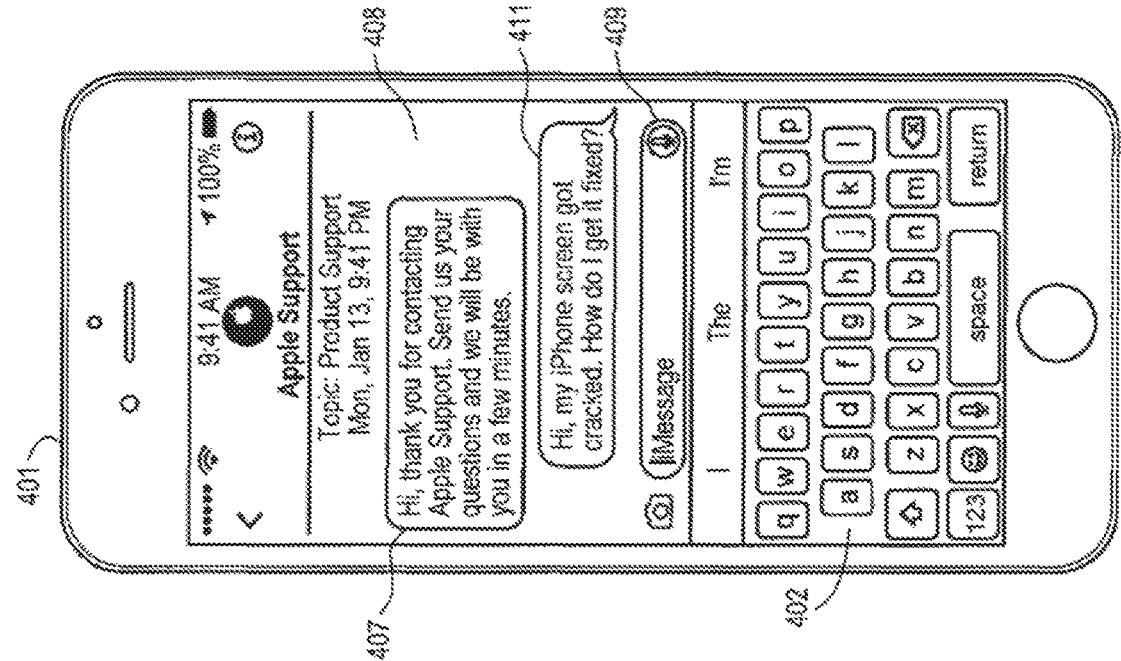
Figure 7E:
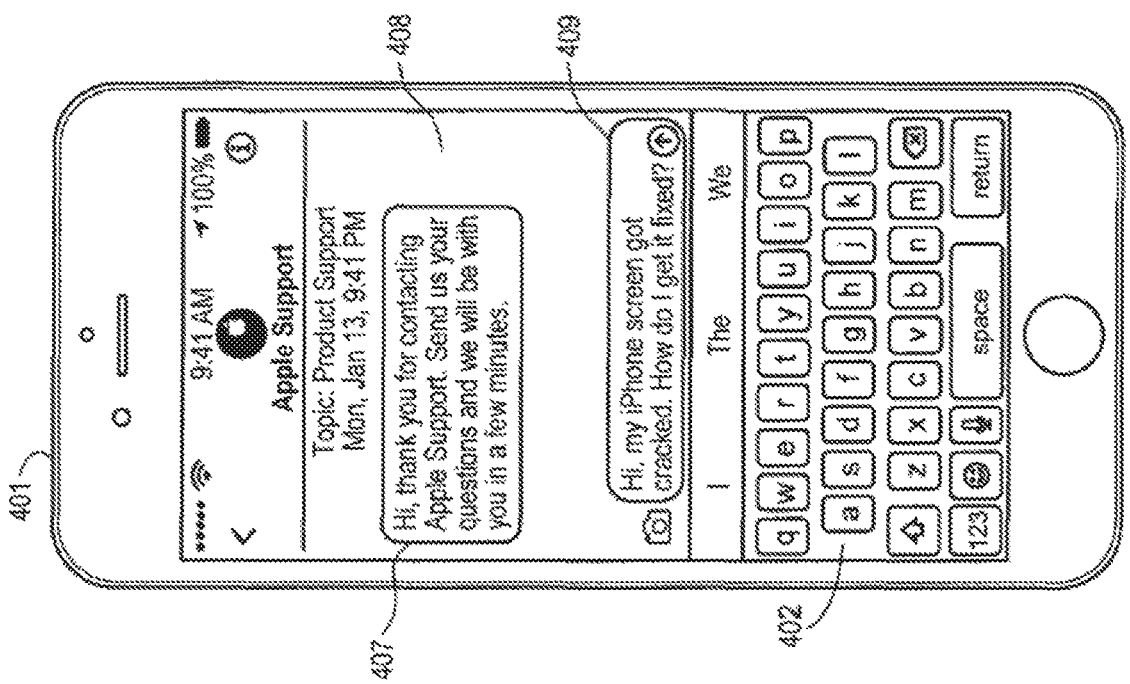
Figure 7H:
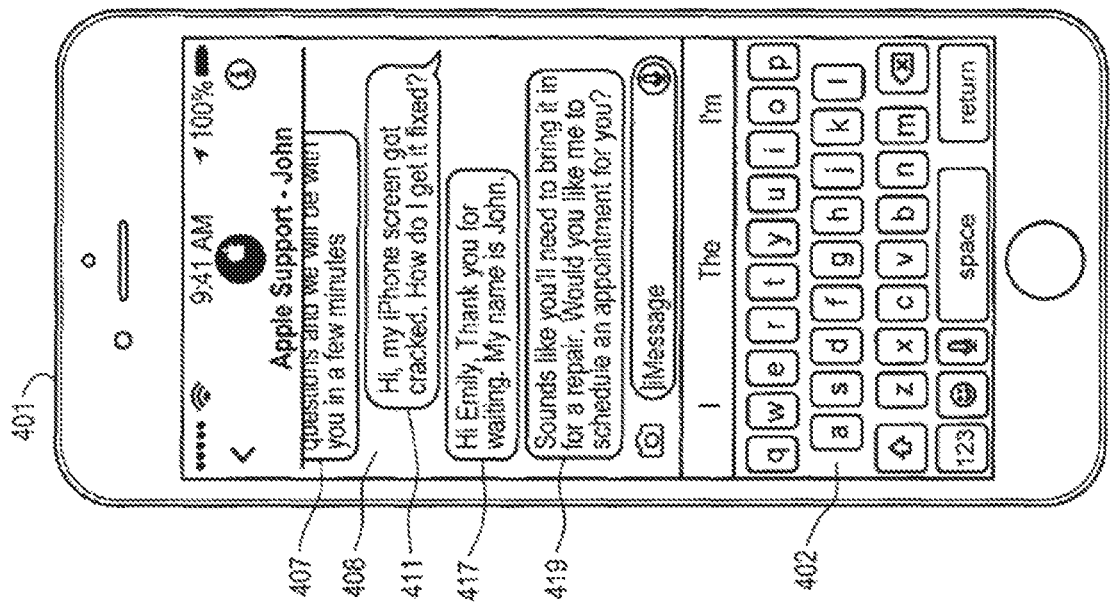
Figure 7G:
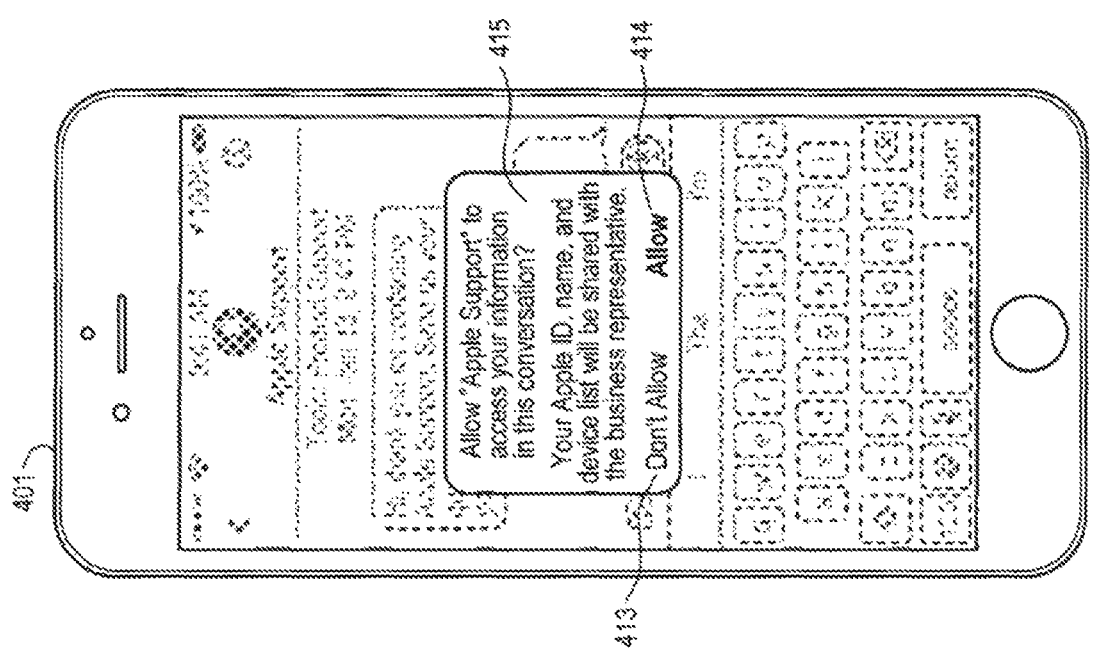
Figures 7I, 7J:
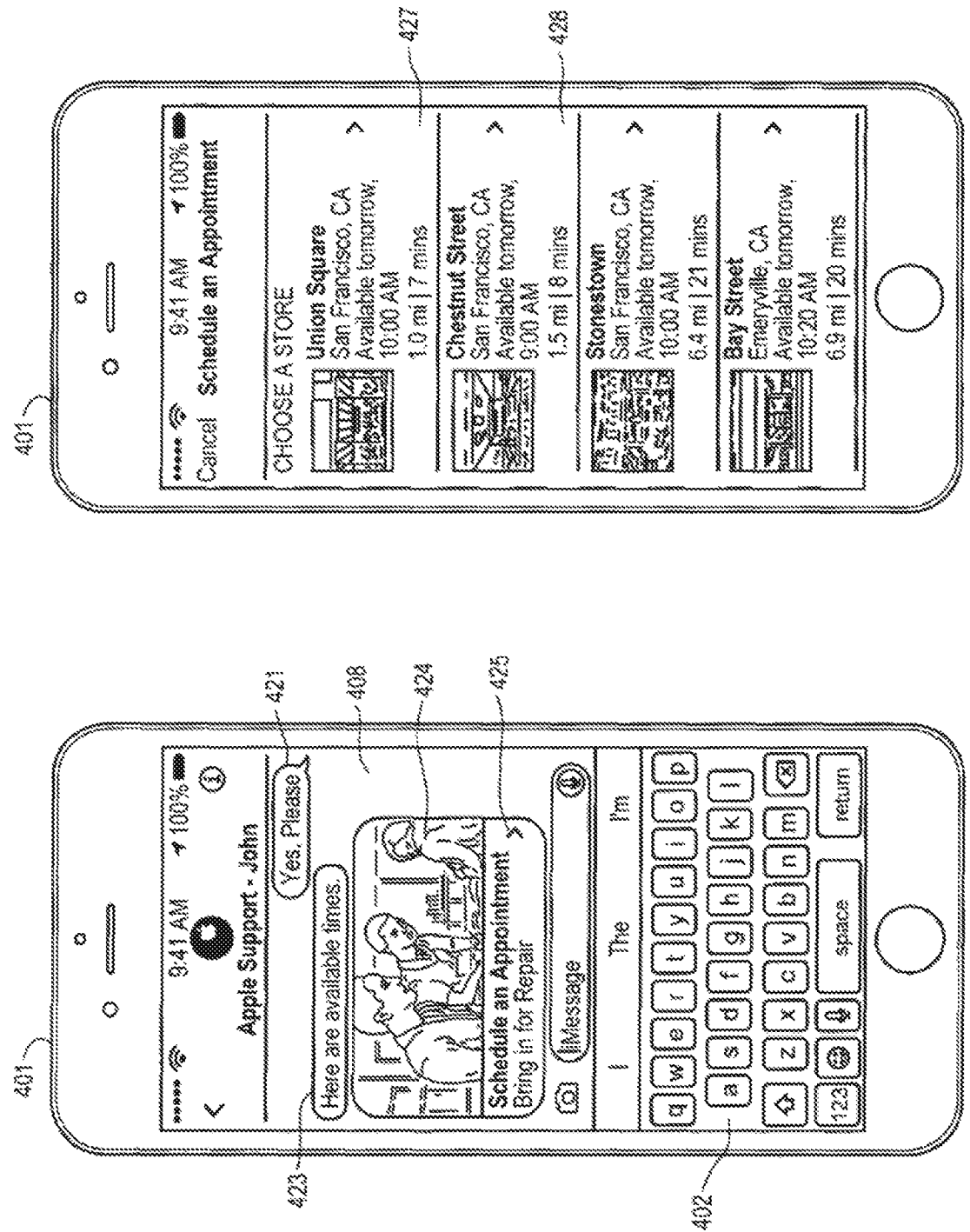

FIGS. 7A through 7N show an example of a messaging session between a business and a customer of the business according to one embodiment. The messaging session is shown on a smartphone 401 which can be the customer's device and can be similar to client device 171 or client device 173, which communicates through one or more messaging servers 169 with one or more messaging systems at the business, such as messaging system 151 or messaging system 153 shown in FIG. 3. The messaging session occurs after the business enters account information into a registration database and also after one or more message identifiers for use by a messaging identification system are also established for the business so that one or more messaging identification servers can properly identify the business and account information necessary to establish the messaging session in one embodiment. The messaging session can begin as shown in FIG. 7A with the user interface of the messaging application on the device or smartphone 401 shown or displayed on the screen of the device or smartphone 401. The user interface includes an on-screen keyboard 402 and an area immediately above the on-screen keyboard for entry of text, and an area above that for the display of a message transcript. Near the top of the screen is a "to" text entry field 403 into which a user can enter a name associated with the messaging account in the messaging system. In the example shown in FIG. 7B, the user has begun to enter the phrase "Apple support" into the "to" text entry field 403, and the device responds by displaying a messaging option 404 which can be selected to initiate a text messaging session with the business associated with this messaging account. The entry of text into the text entry field 403 may cause a search through contacts locally stored on smartphone 401 or remotely stored in one or more databases, such as a contact database in cloud storage or the maps database 163 or the database 165. The user can select the messaging option 404 by tapping or touching the messaging option 404 which can result in the messaging application presenting the user interface shown in FIG. 7C. In this user interface, the messaging application presents a set of possible topics which the user can select in a messaging session with a business or a group within the business; the set of possible topics is shown as topic picker 405 which can result from (or be) the initial response from the business. In this instance, the group within the business is a support group which provides support to customers of the business. The user interface shown in FIG. 7C presents the topic picker 405 which allows the customer to pick one of the topics for the messaging session. In one embodiment, the topic can represent an intent identifier or a group identifier for purposes of the messaging session and this data about the intent and group can be passed back and forth, in a manner which is similar to how cookies are passed back and forth in a web browsing session. The passing of the intent and group information back and forth during the messaging session allows a business to categorize a messaging session in order to appropriately deal with the messaging session both in terms of who or what group within a business handles the messaging session and the purpose of the messaging session and also how the messaging session can be structured in function and operation. In one embodiment, after the user selects a topic from the topic picker 405, the messaging application can present the next user interface shown in FIG. 7D, in which the message bubble 407 is shown in the message transcript 408. The message bubble 407 is an example of an initial response from a business after a messaging session has been initiated. In one embodiment, this initial response can include an estimated response time or estimated wait time. In the example shown in FIG. 7D, the message in message bubble 407 requests that the user send questions to the business, which the user does as shown in FIG. 7E in which the user has entered text into the text staging area 409 and then causes that text to be sent as the next message in the messaging session as shown in FIG. 7F. The message transcript 408 shown in FIG. 7F now includes message bubble 407 and message bubble 411. As shown in FIG. 7D, at some point during the messaging session an alert 415 is presented on the smartphone 401 asking the user whether the user will allow the business to access certain user information in connection with the user during the messaging session. In this case, information about the customer relative to the business may be stored on the smartphone 401 or may be stored remotely in a database of the business, and in either case, the user is asked to allow or not allow the use of that information as part of the messaging session. If the user selects the allow option 414, then the messaging session can use that information and the user of smartphone 401 will not need to enter that information separately during the messaging session if it turns out that the information is required for purposes of the messaging session. If the user selects the "don't allow" option 413 then the user may have to enter such information during the messaging session. It will be appreciated that the alert 415 can be presented at different times during the messaging session, such as near the end of the messaging session rather than the beginning of a messaging session. A further response is received by the smartphone 401 as shown in FIG. 7F, in which two additional message bubbles are now shown in the message transcript 408. In particular, message bubble 417 and message bubble 419 now appear within the message transcript 408. Message bubble 419 asks the user whether the user would like to schedule an appointment to repair smartphone 401. As shown in FIG. 7I, the user's smartphone 401 responded to the message in message bubble 419 with the message shown within message bubble 421, which indicates that the user does want to schedule an appointment for a repair. In response, the business responds with bubble 423 and an image 424 and a scheduling button 425. In response to the selection of the scheduling bubble 425 a set of one or more available stores are displayed within the messaging application as shown in FIG. 7J. In the example of FIG. 7J, several available locations to schedule an appointment include locations 427 and 428. The user can then select one of the locations which can result in the display of available times at that location as shown in FIG. 7K. The messaging application as shown in FIG. 7K now displays a set of dates 430 and available times at the particular location, including time 429 which the user can select which will then cause the messaging app to send the user's selection of the location and the time back to the business when the user selects the send button 433 in FIG. 7L. The selection of the time 429 as shown in FIG. 7K can result in the display of the user interface shown in FIG. 7L, in which the selected option 431 for both the location and the time are shown before the message is sent. After the message is sent by the selection of the send button 433, the message bubble 431A appears in the message transcript 408 as shown in FIG. 7M, and then the business responds with the message shown in message bubble 435 which confirms the appointment at a particular location selected by the user and at the time and date selected by the user. Further messages can be exchanged between the customer and the business as shown in FIG. 7N by the additional message bubbles 436 and 437 which appear after message bubble 435 within the message transcript 408.

Figure 8B:
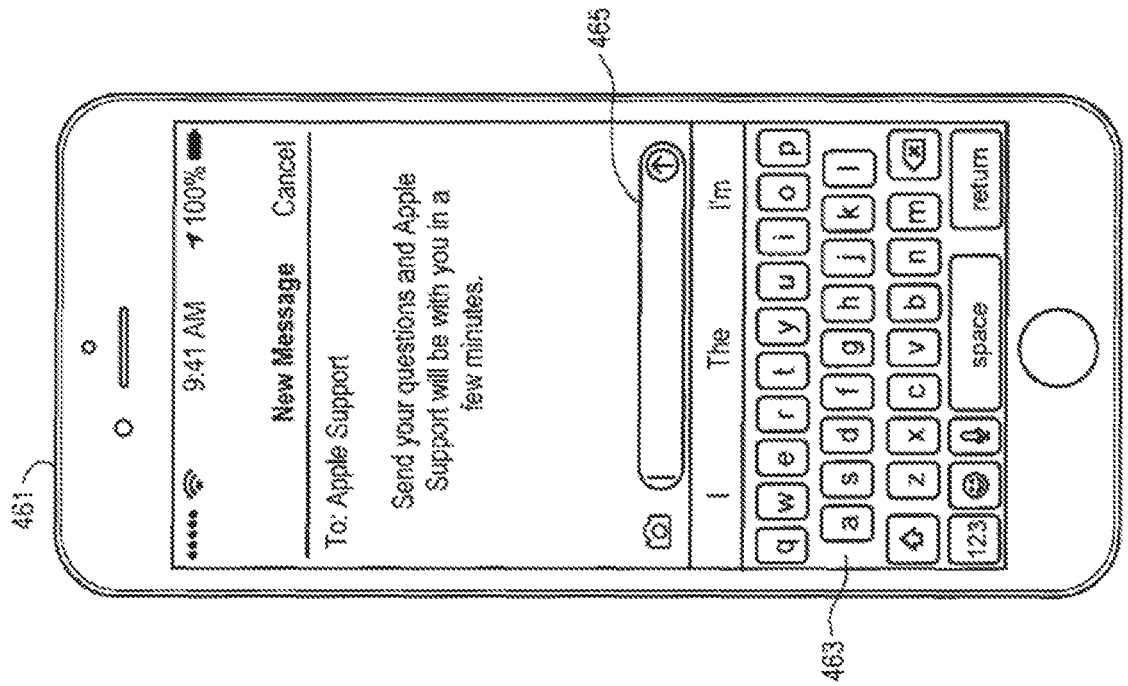
FIGS. 8A and 8B show an alternative embodiment for picking a topic of a messaging session with a business.
Figure 8A:
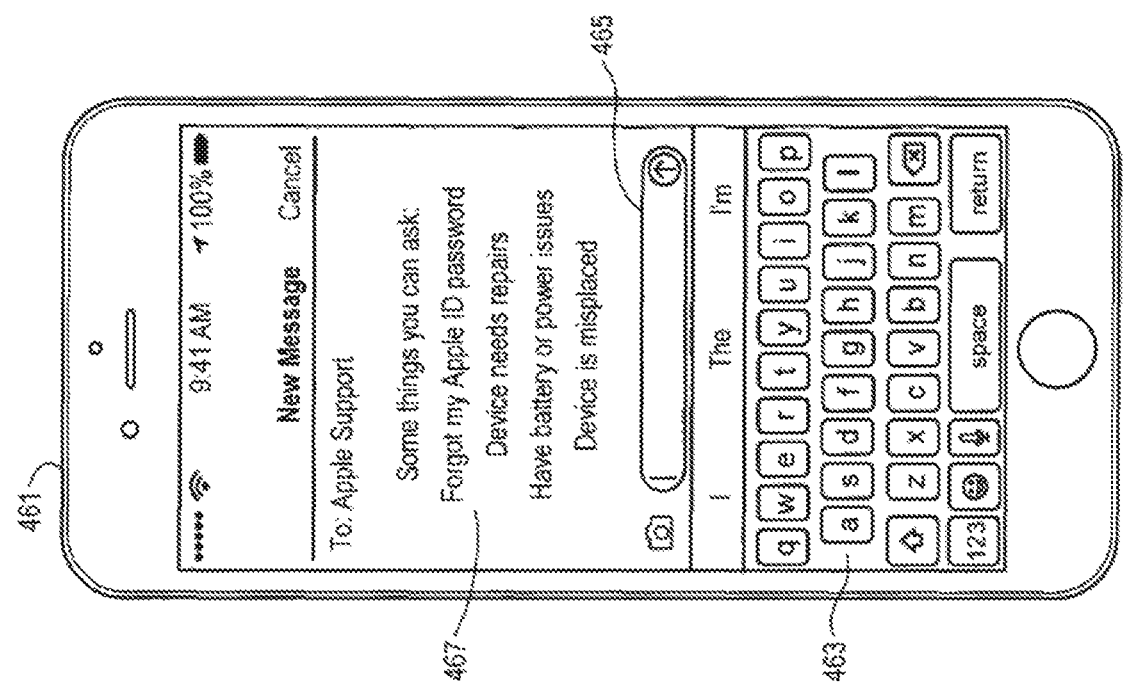

FIGS. 8A and 8B show an alternative embodiment for a topic picker which is shown as topic picker 467, which suggests possible questions or topics for a user to enter into the text staging area 465 using the on-screen keyboard 463. In the example shown in FIGS. 8A and 8B, the messaging application in one embodiment has already established a messaging session with the business and the business can respond with a topic picker 469 to guide the user through the process of selecting a topic which in one embodiment can be an intent identifier or a group identifier depending on how the business wants to define a messaging session.

Figure 9B:
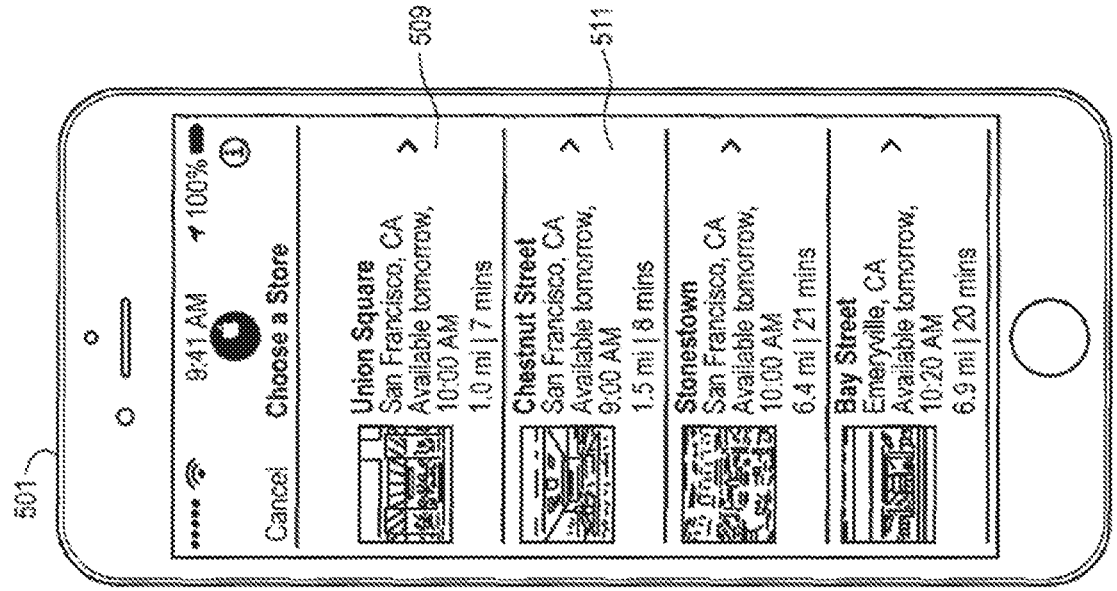
Figure 9A:
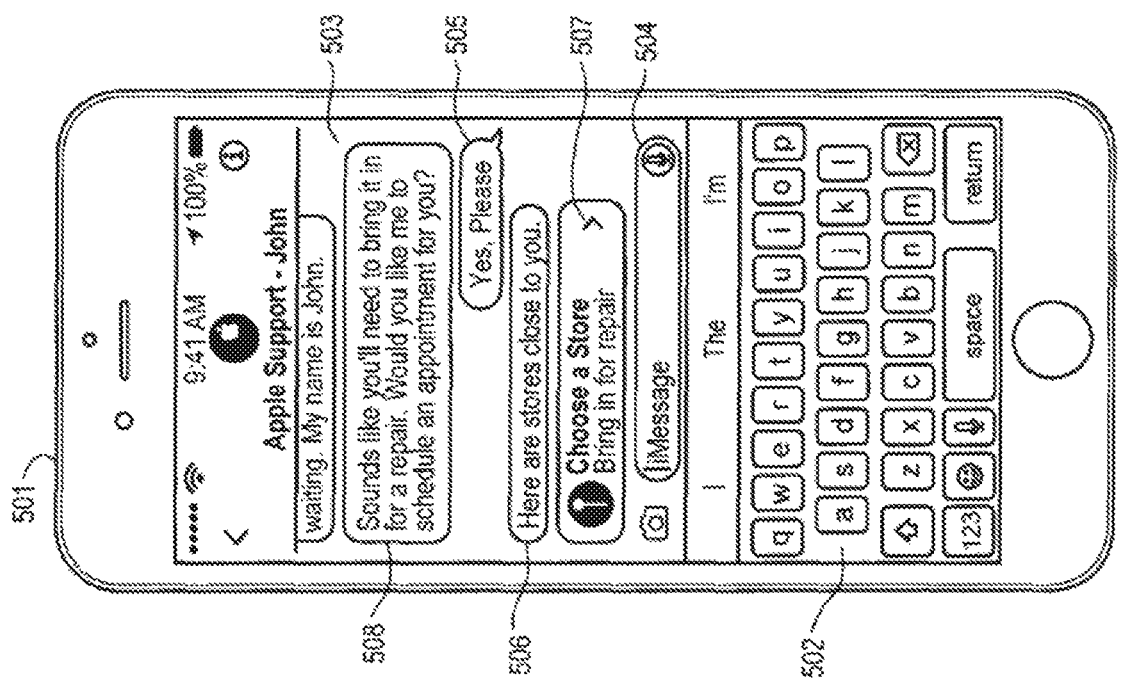
Figure 9D:
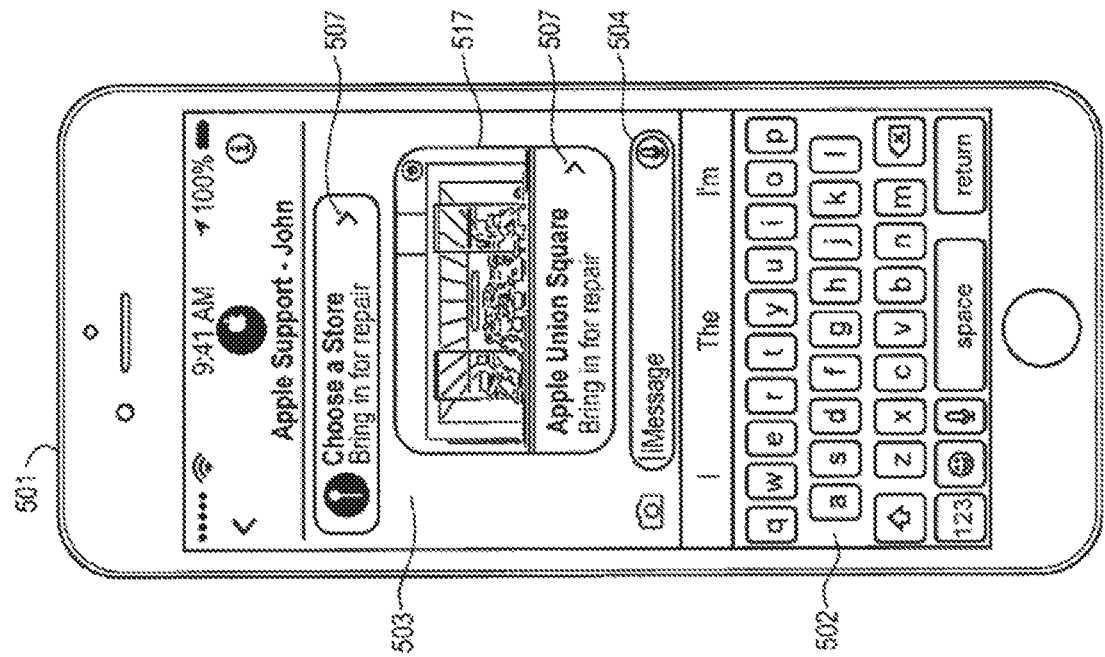
Figure 9C:
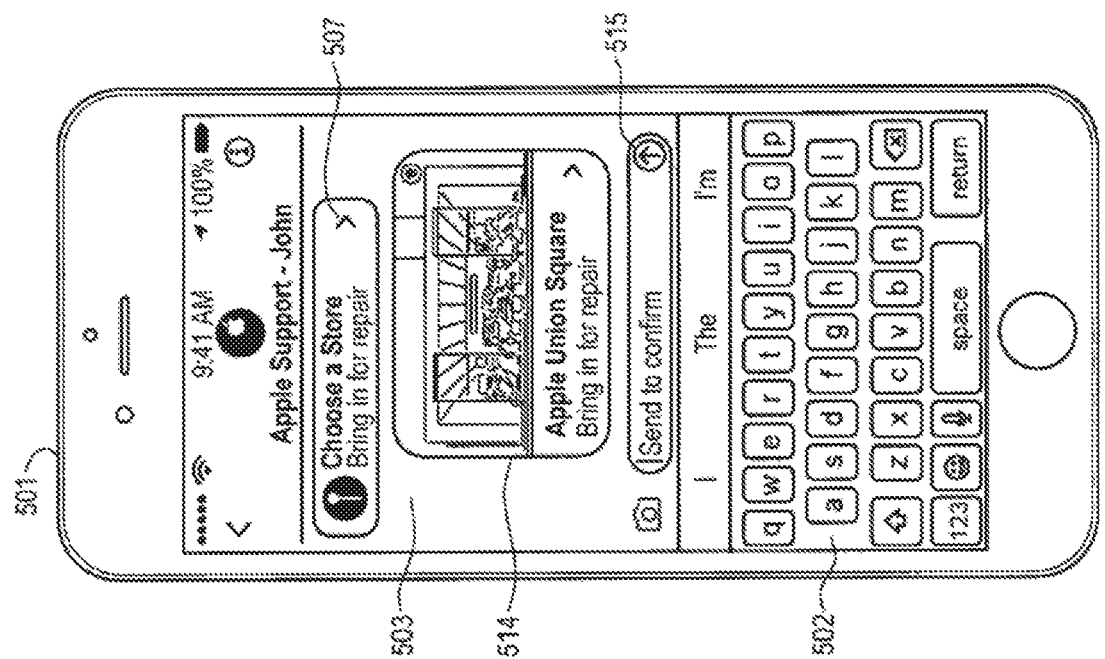
Figure 9F:
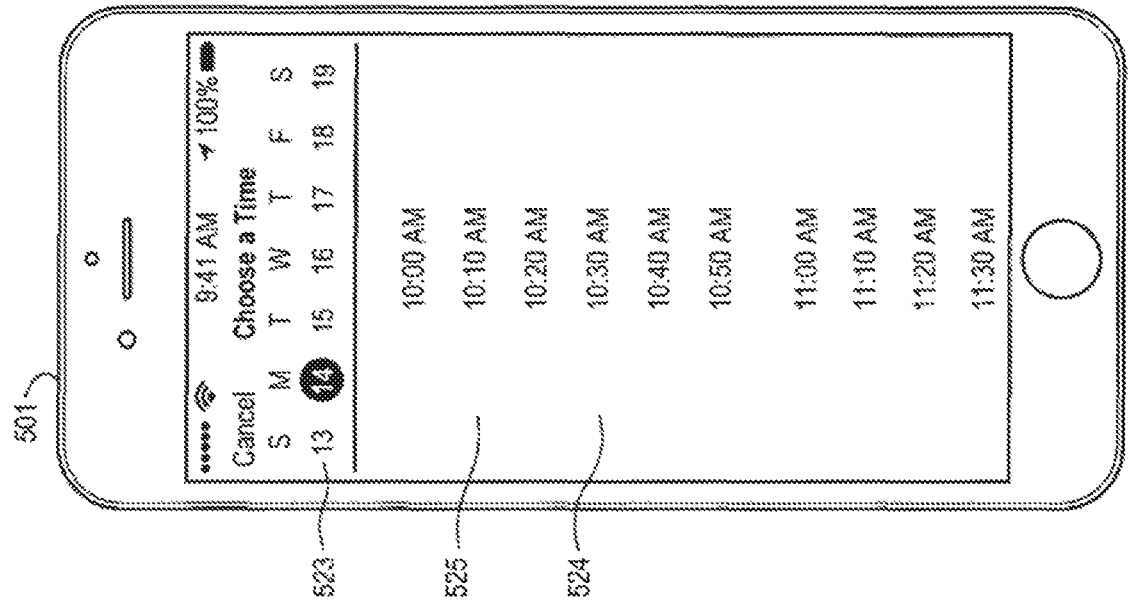
Figure 9E:
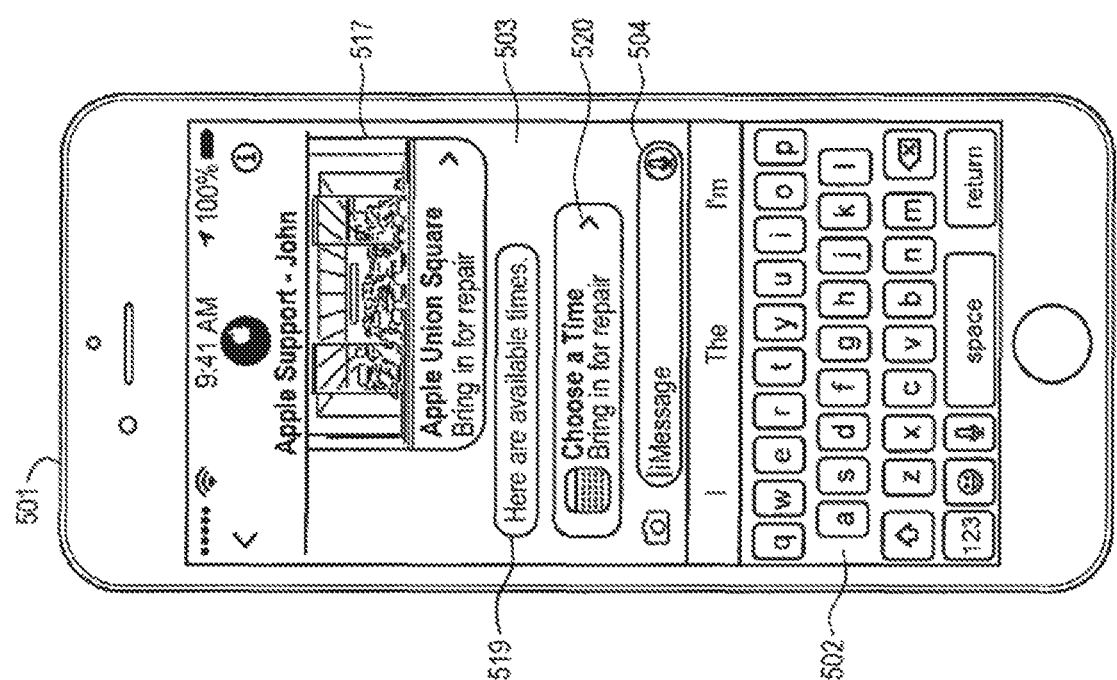

FIGS. 9A, 9B, 9C, 9D, 9E, and 9F show an alternative embodiment for scheduling an appointment in a messaging session. In this embodiment, the user of a smartphone 501 has initiated a messaging session with the business and the message transcript 503 includes message bubbles 508, 505, and 506 along with the store selector which includes a store selector button 507 which the user can select to cause the display of the user interface within the messaging application shown in FIG. 9B. The smartphone 501 also includes an on-screen keyboard 502 and a text staging area 504 shown within the user interface of the messaging application. In the user interface for the store selector shown in FIG. 9B, one or more store locations can be presented, such as locations 509 and 511 which the user can select. In the example shown in FIG. 9B, the user has selected the store location at Union Square causing the messaging application to present an image of the store at Union Square as image 514. The user can send the selected store location by selecting the send button 515. Once the send button 515 is selected, the selected store is sent back in the messaging session to the business and now appears within the message transcript 503 in the message bubble 517 shown in FIG. 9D. The business can then respond in the messaging session by sending back text within the message bubble 519, which prompts the user to select one of the available times at the selected location. The user can then select the time selector button 520 to cause the presentation within the messaging application of available times and dates as shown in FIG. 9F. The user can select one of the dates along dates input region 523 and one of the times such as times 525 and 524. Once the user has selected a date and a time, a message can be sent back to the business with the selected date and time for the previously selected store, which causes the message bubble 517 to be updated as message bubble 517B after the user selects the send button 515 shown in FIG. 9G. The selection of the send button 515 causes the selection of the time for the previously selected store to be transmitted as another message in the messaging session, and the business can respond with a confirmation message shown within message bubble 531. Further additional message bubbles can also reflect further messages (such as message bubbles 535 and 537) in the messaging session after the confirmation shown within message bubble 531.

Figure 10A:
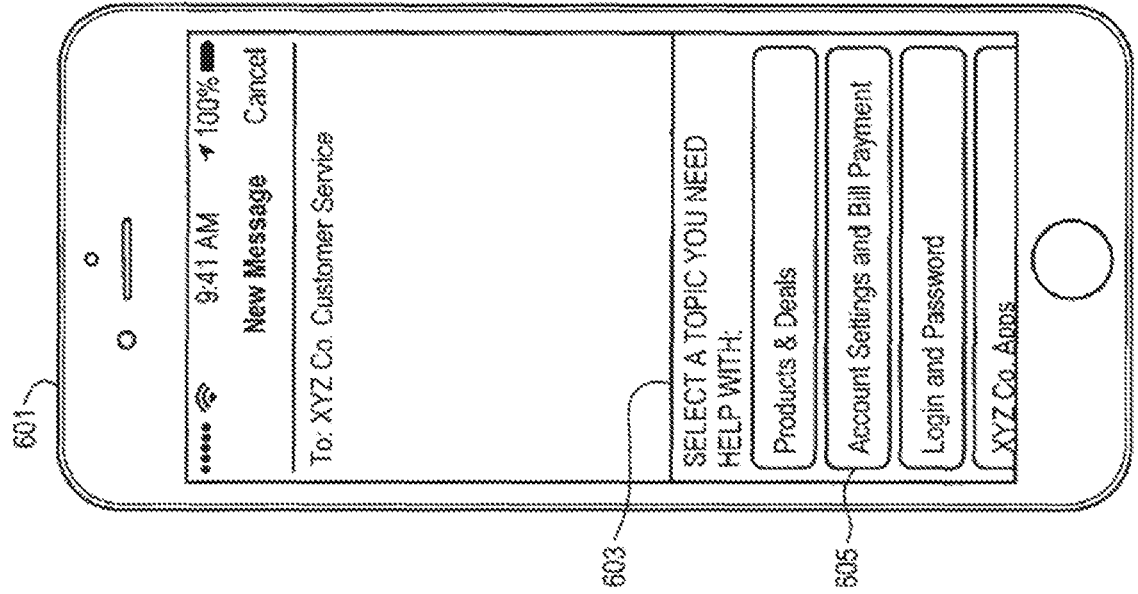
FIGS. 10A, 10B, and 10C show an embodiment on a customer's device for authenticating the customer to a business according to one embodiment.
Figure 9I:
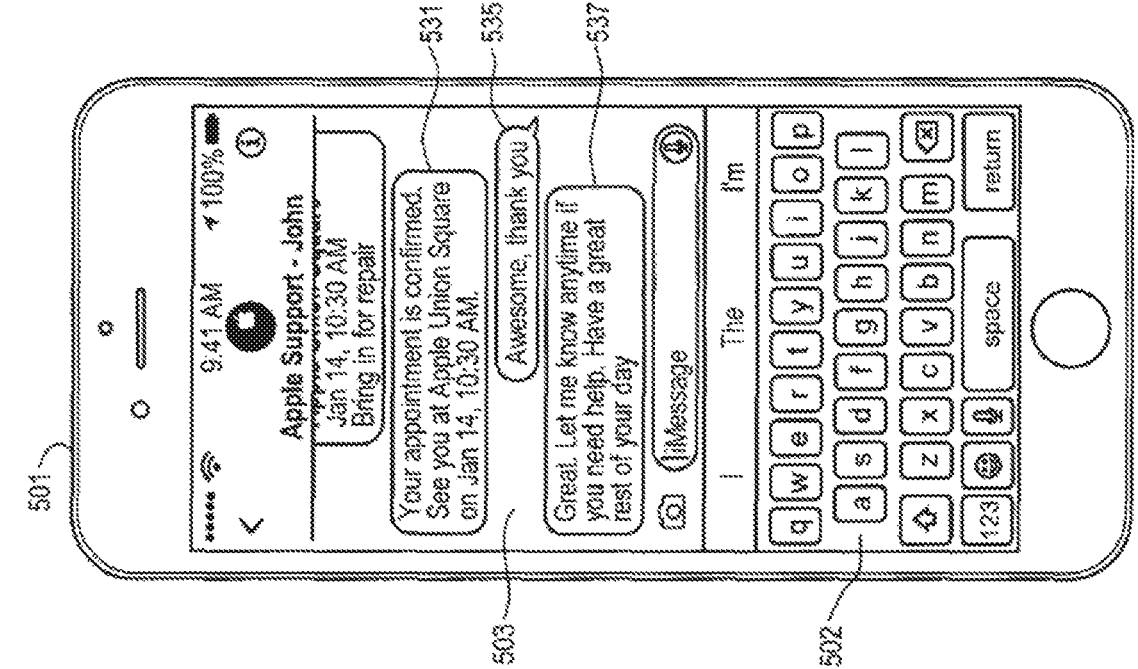
Figures 10B, 10C:
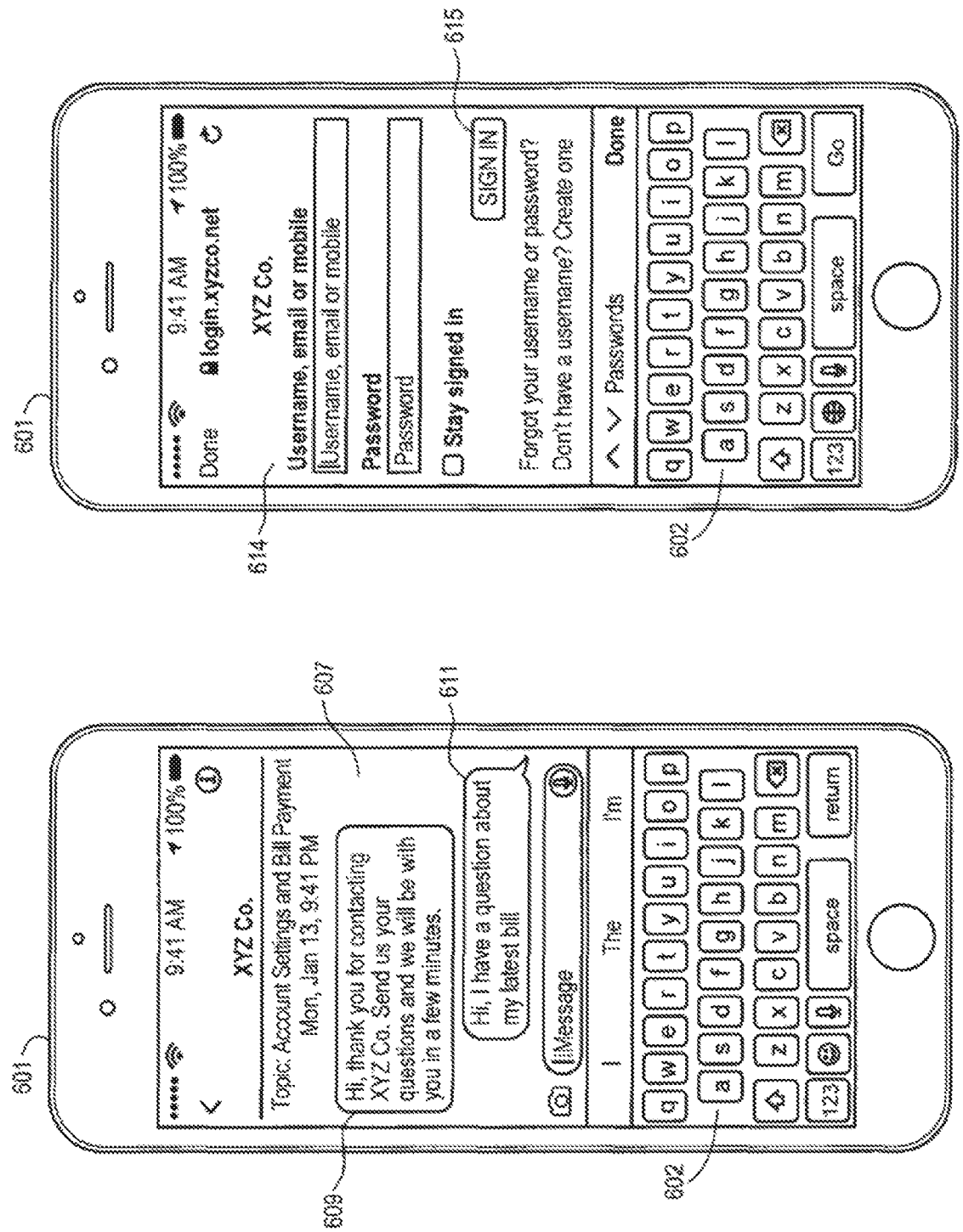

FIGS. 10A, 10B, and 10C illustrate an embodiment in which user information or customer information can be provided to a business during a messaging session with the business. In this example, a user is using smartphone 601 to conduct a messaging session with a business from which the user buys goods or services. The beginning of the messaging session can include the display of a topic picker 603 which can be a message sent from the business to the user as a response to the initial text message from the user or as a response to the initiation of the messaging session with the business. In the example shown in FIG. 10A, the topic picker includes a topic "account settings and bill payment" as option or topic 605. In this instance, the user selects topic 605 causing the presentation of the user interface of the messaging app shown in FIG. 10B. The messaging app includes the message transcript 607 and two message bubbles 609 and 611 along with an on-screen keyboard 602. Message bubble 609 shows that the business has responded to the selected topic of topic 605 with a message indicating the estimated response or wait time in message bubble 609. In response, the user enters a question as shown in message bubble 611 and at some point, the business can respond with a request for user information from the user, such as a user name or password or more, depending on the information required by the business. The user can enter the user requested information and then select the sign in button 615 to continue the messaging session with the business. In one embodiment, if the user has already been authenticated within the business's on-device application or web site (e.g., through entry of a user name and password), then the business may use the authentication within the messaging application and not require the user to re-enter the authentication credentials. In an embodiment, a payment option presented to the user can be a mobile payment system. If use of a mobile payment system is selected, a place card displaying an itemized bill can be displayed.

Figures 11A, 11B:
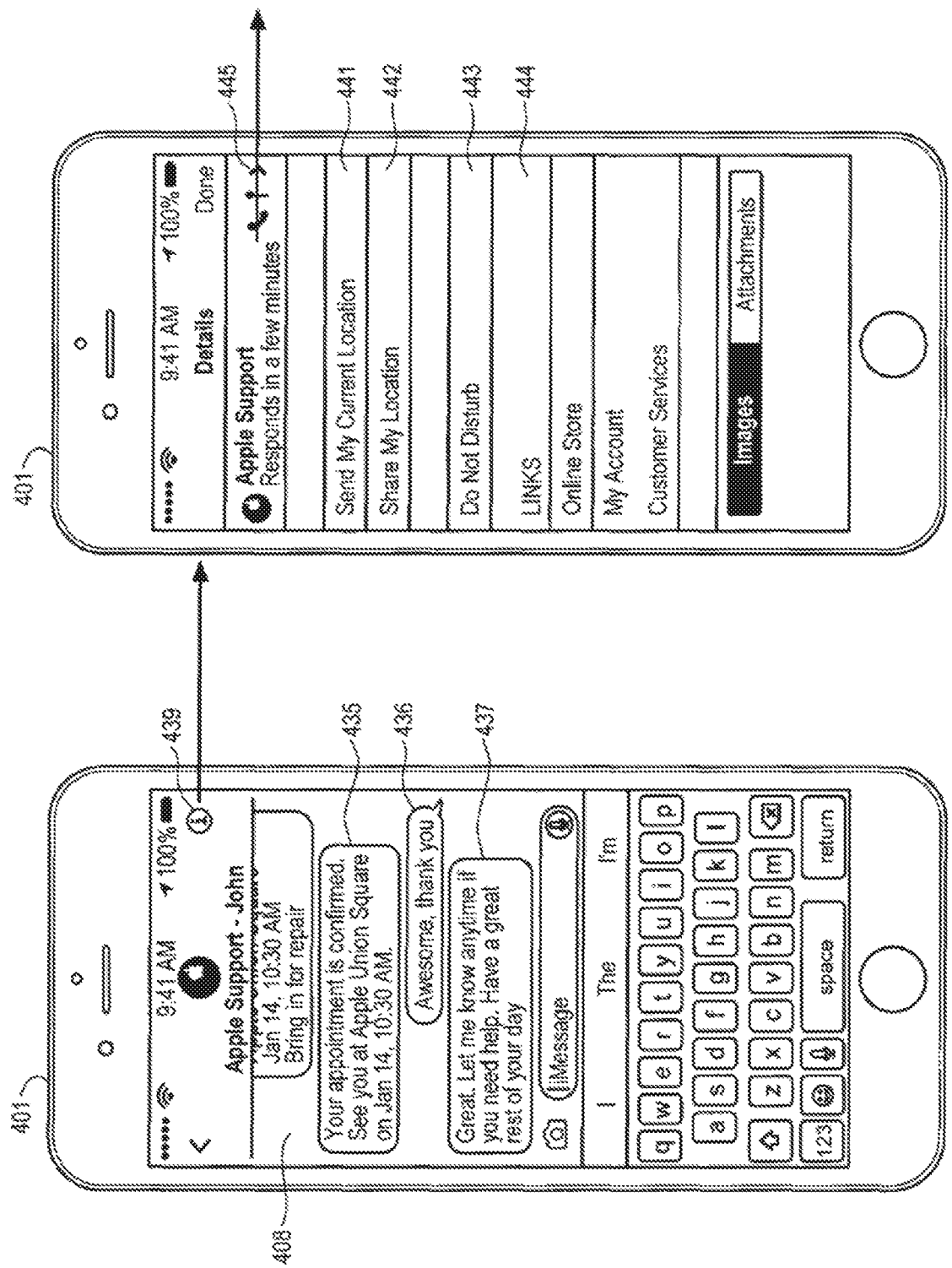
FIGS. 11A, 11B, and 11C show an example of business information being provided to a customer or user on the customer's device according to one embodiment.
Figure 11C:
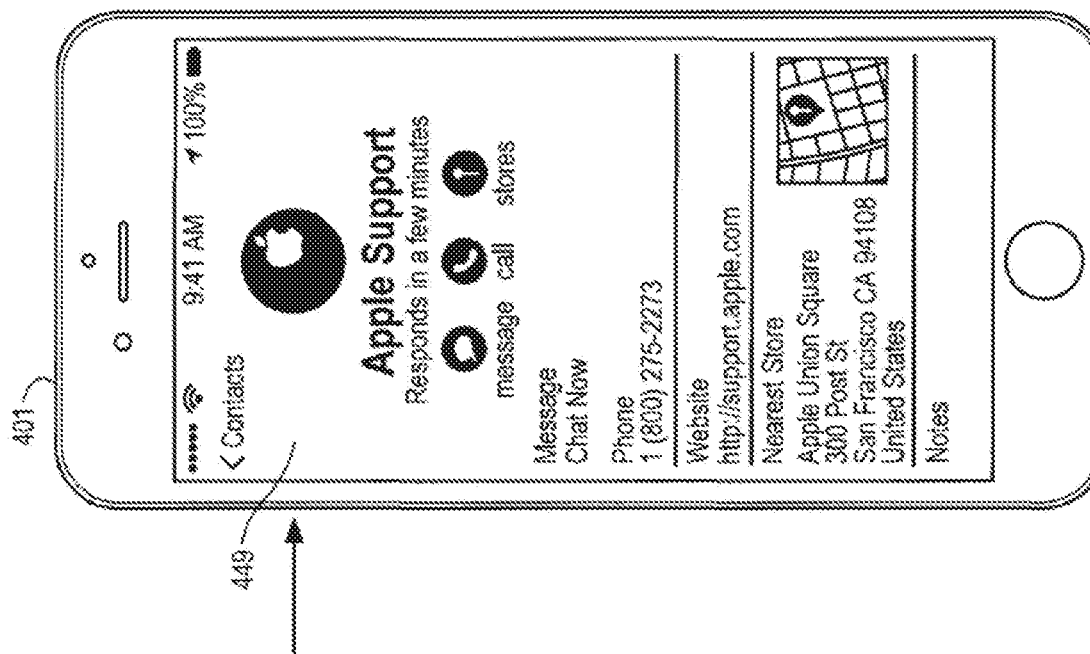

FIGS. 11A, 11B, and 11C show an example of how a user can obtain information about the business during a messaging session. In this example, the user is near the end of a messaging session shown in the example provided above relative to FIGS. 7A through 7N. FIG. 11A shows the end of that messaging session on smartphone 401 and shows that an information button 439 is available for the user to select which can cause the display of information shown in FIG. 11B. This information includes options which can be selected including contact option 445 to display contact information 449 shown in FIG. 11C for the business. This contact information 449 can include location information, website information, one or more phone numbers and other information. Moreover, the contact information can also include user selectable options to initiate a phone call or a messaging session or display information about a location on a map. As shown in FIG. 11B, the information about the business can include various selectable options that allow the user to send the user's current location (option 441), or share the user's current location (option 442) or take other actions such as requesting that the user not be disturbed (option 443). In addition, the details shown in the user interface of FIG. 11B can include additional options 444 to cause the presentation of other information about the business or the user's account with the business.

In one embodiment, a messaging session between a user and a business can exist (and remain stored in a transcript on the user's device) until the session is closed by the user. A user can, in one embodiment, manage their messaging preferences by, for example, selectively unsubscribing from specific types of messages or selectively muting (e.g., turning off notifications) specific types of messages or by "muting" an entire conversation so that the user continues to receive messages in the background without the presentation (e.g., alerts or sounds or display of alerts) of notifications. Some messages in a conversation with a business can cause a notification (e.g., a sound or displayed alert or both) to be presented (when the messaging application is a background application) while other types of messages may not cause any notifications. In one embodiment, the notification can be displayed on a lock screen (when the device is locked) if the message has a high priority, while low priority messages may not be displayed on the lock screen.

In one embodiment, a business can use its messaging session with a user to invoke a business process or flow. For example, a messaging extension application of the business can be invoked within the messaging application to process information or control the flow of the messaging session according to the business's desired business process or flow. For example, a user can request, through an initiated messaging session, an airline to change a seating arrangement, and the airline's messaging extension application can impose or direct a business process or flow to cause the user to follow the process or flow in order to change a seating arrangement on an airplane. Further, a business can set a flag on some of its messages so some of those messages are not replyable (the user cannot reply to the message that has been "flagged" by the business).

In another embodiment, a messaging session with a business can involve two or more persons or devices and the business who interact through the conversation with a customer of the business. For example, a user can initiate a service request with a business and begin the messaging session with a first employee of the business and the session continues after a second employee joins the session.

In one embodiment, a user's device can use its determined location to notify (through a notification) a user that a messaging session can be initiated (or resumed) based upon the determined location. For example, if the user is near a store of a business and has recently been involved in a messaging session with the business, the user's device can, using location techniques such as GPS, etc. determine the proximity to the store and determine that a recent messaging session involves the store or business and in response the user's device can present a notification to ask if the user would like to resume the messaging session.

As described above, a client device, such as client devices 171, 173, 201, 401, may execute multiple software applications that can provide various entry points into a messaging session provided by a messaging application, such as the messaging application 217 shown in FIG. 5. The entry points, as described above, may include one or more messaging options to initiate or establish a messaging session with a business or organization that has established a business messaging account with a business messaging system, such as the messaging system shown in FIG. 3. The various software applications executed on the client device may display various selectable messaging identifiers to a user and one or more of the various messaging identifiers may be registered with a business messaging system shown in FIG. 3. Examples of such messaging identifiers include, but are not limited to, telephone numbers and other contact information provided by a business or organization when establishing a business messaging account with the business messaging system.

Figure 12A:
FIGS. 12A-D illustrate example user interfaces that may be displayed in a system for initiating a business messaging session in accordance with one or more implementations.

As described above, the various messaging identifiers may be displayed to a user of the client device in response to different interactions with the applications executed on the client device. For example, as shown in FIG. 12A, a software application such as a web browser may provide one or more messaging identifiers, such as messaging identifier 1250, as part of a search result for customer support of an organization. As shown in FIG. 12A, messaging identifier 1250 is a telephone number associated with a business. The client device may display a messaging option for a business or organization that is associated with the business messaging system based on a determination of whether a messaging identifier associated with the business or organization is registered with the business messaging system.

Figure 12B:
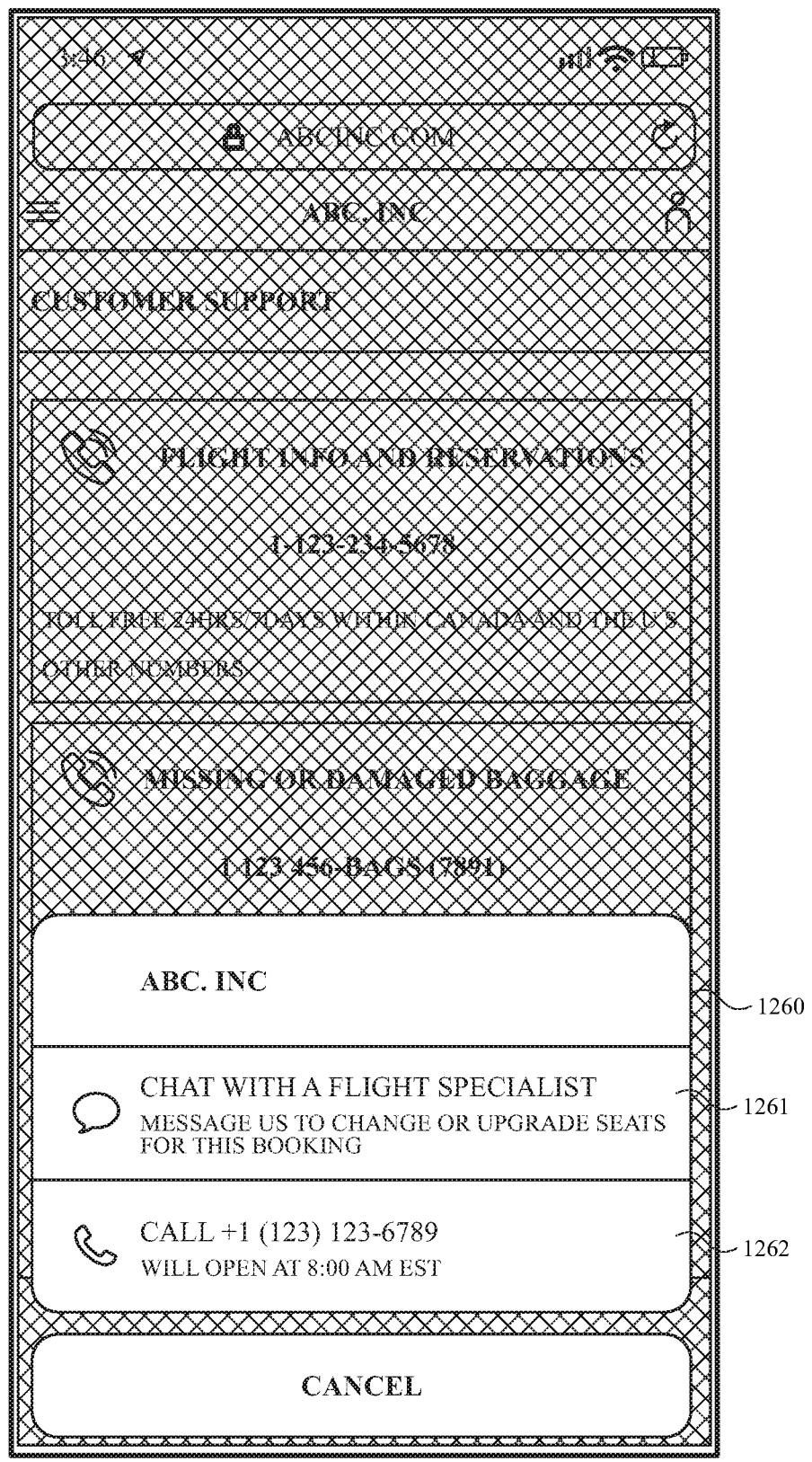

For example, if a user selects the messaging identifier 1250, then the client device determines whether the messaging identifier 1250 is registered with the business messaging system. If the client device determines that the messaging identifier 1250 is registered with the business messaging system, then the client device may be configured to display a user interface associated with the business messaging system, such as the user interface 1260 shown in FIG. 12B. The user interface associated with business messaging system may include one or more messaging options to establish a messaging session with the business associated with the messaging identifier, and one or more other contact options to communicate with the business. For example, as shown in FIG. 12B, the user interface 1260 includes messaging option 1261 to establish a messaging session with the business associated with messaging identifier 1250 (shown in FIG. 12A), and an option 1262 to initiate a telephone call with the associated business. If a user selects the messaging option 1261, the client device may be configured to display user interfaces for messaging sessions described above, for example, user interfaces described with reference to FIGS. 7C-11C.

Figure 12C:
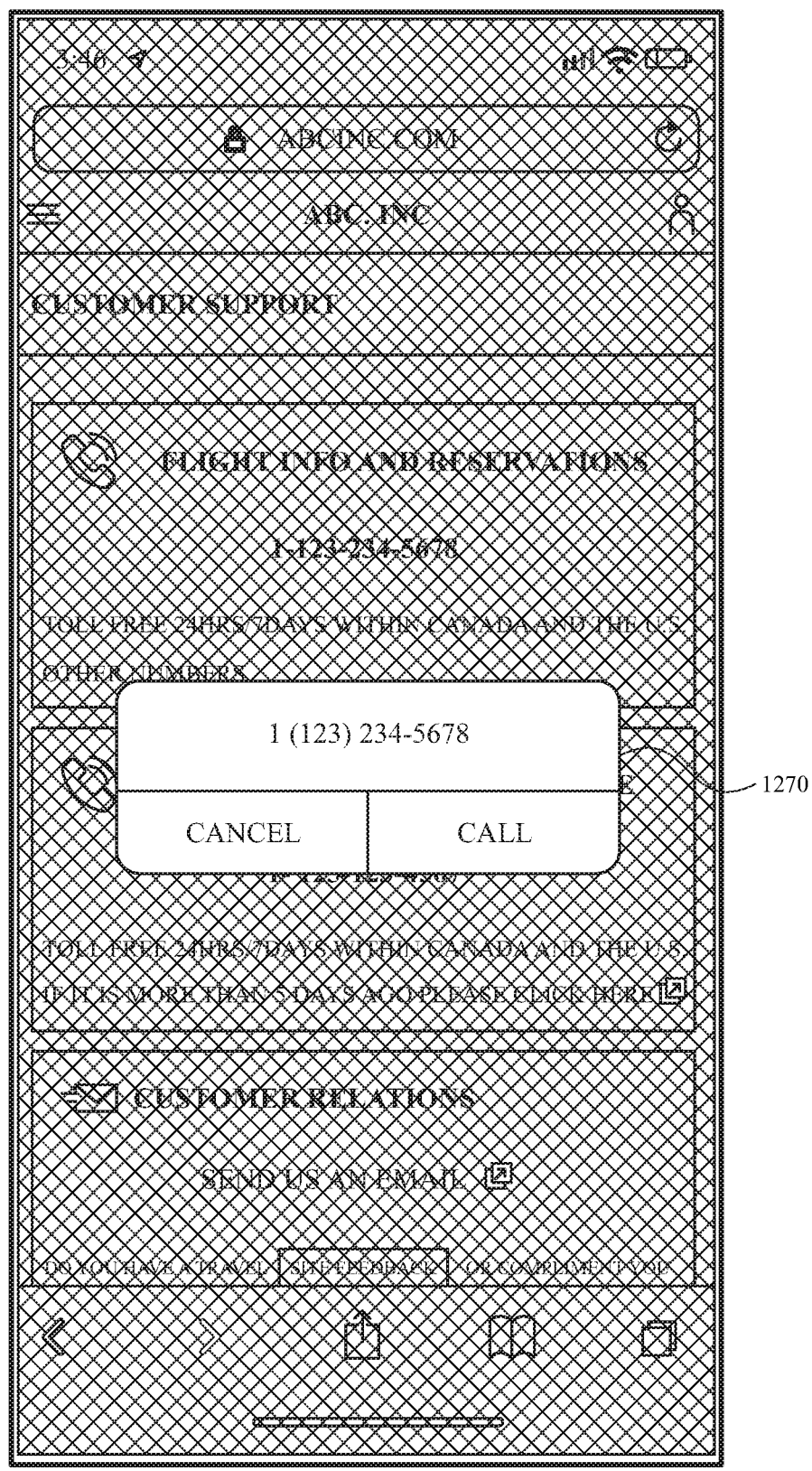
Figure 12D:
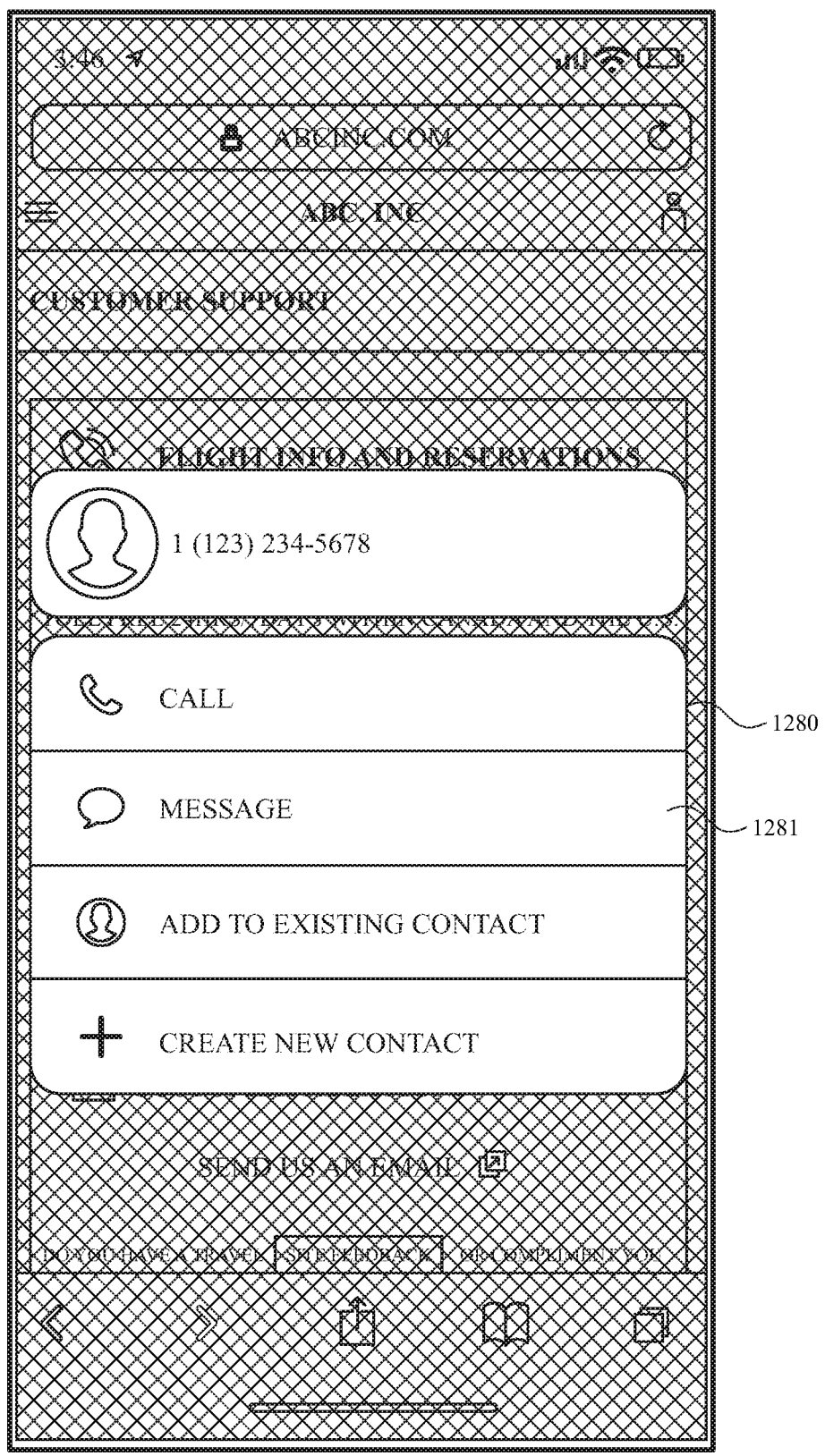

If the client device determines that the messaging identifier 1250 is not registered with the business messaging system, then the client device may provide a user interface associated with a non-business messaging system or a user messaging system, such as user interface 1270 or user interface 1280 as shown in FIGS. 12C and 12D, respectively. As shown in FIG. 12D, the client device may provide a user messaging option, such as the user messaging option 1281 included in the user interface 1280, to establish a messaging session with the messaging identifier 1250 via a user messaging system, which is separate and different from the business messaging system described above with reference to FIG. 3, just as the user interface 1280 for accessing the user messaging system is different from the user interface 1260 for accessing the business messaging system. Additional details of a client device determining whether a selected messaging identifier provided and/or displayed within any of the software applications executing a client device is registered with a business messaging system are described with reference to FIG. 13.

Figure 13:
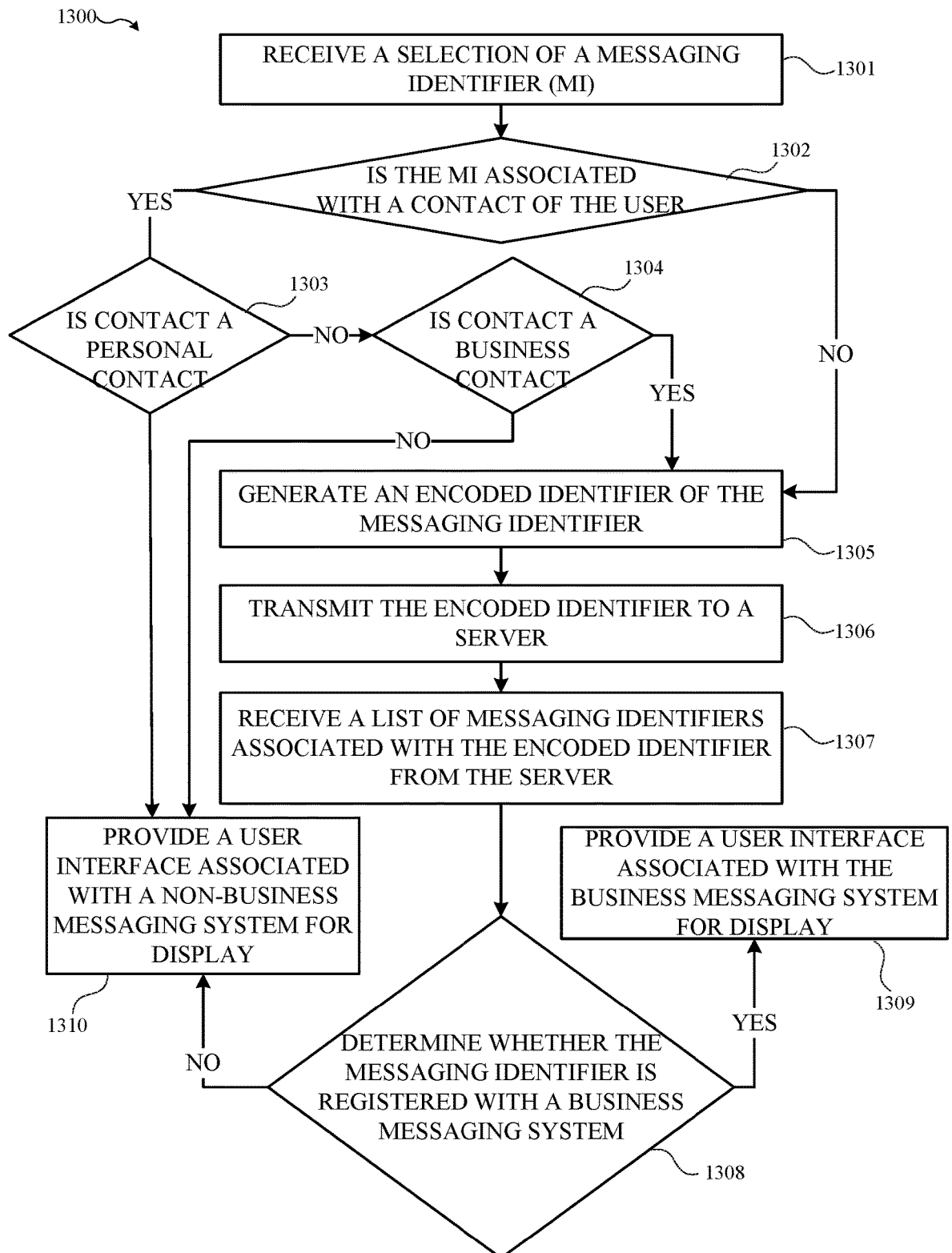
FIG. 13 illustrates a flow diagram of an example process for initiating a business messaging session in accordance with one or more implementations.

FIG. 13 illustrates a flow diagram of an example process 1300 for initiating a business messaging session in accordance with one or more implementations. For explanatory purposes, the process 1300 is primarily described herein with reference to the client device 171 of FIG. 3. However, the client device 171 is presented as an exemplary device and the operations described herein may be performed by any suitable devices, such as the client device 173. Further for explanatory purposes, the operations of the process 1300 are described herein as occurring in serial, or linearly. However, multiple operations of the process 1300 may occur in parallel or at least partially overlap. In addition, the operations of the process 1300 need not be performed in the order shown and/or one or more of the operations of the process 1300 need not be performed and/or can be replaced by other operations.

The example process 1300 begins when an electronic device, such as the client device 171, receives a selection of a displayed messaging identifier (1301). As described above, messaging identifiers may be displayed within a user interface of any software application executing on the client device 171, and may include telephone numbers and any other contact information associated with a business or organization.

In one or more implementations, the selection may be received in conjunction with the client device 171 detecting a touch-down event with respect to the displayed messaging identifier and prior to detection of a corresponding touch-up event. The detection of a touch-down event may refer to detecting that the touchscreen has been touched, e.g. directly or indirectly, by a user, such as with their finger or using a stylus. The detection of a touch-up event may refer to detecting that the user has lifted their, e.g., finger, stylus, etc., from the touchscreen.

The client device 171 determines whether the messaging identifier is associated with a contact of the user of the client device 171 (1302). The client device 171 may be configured to compare the selected messaging identifier with a list of messaging identifiers and/or other contact identifiers corresponding to the contacts associated with the user of the client device 171 and, based on the comparison, determine whether the selected messaging identifier is associated with any of the contacts of the user.

For example, if the selected messaging identifier is a telephone number, the client device 171 may compare the selected telephone number with the telephone numbers associated with the contacts of the user of the client device 171, such as via a locally stored contact list. If the selected telephone number matches any telephone number associated with a contact of the user, then the client device 171 may determine that the selected telephone number is associated with a contact of the user. In some implementations, a contact of a user, as used herein, refers to a business, an organization, or a person, or generally any entity that may be included in an address book and/or contact list locally stored on the client device 171.

If the client device 171 determines that the selected messaging identifier is associated with a contact of the user (1302), then the client device 171 determines whether the contact is a personal contact of the user (1303). In some implementations, the client device 171 may determine whether the contact information associated with the contact indicates a personal relationship with the user (e.g., mother, father, brother, sister, husband, wife, son, daughter, and the like). If the contact information indicates a personal relationship with the user, then the client device 171 may determine that the contact is a personal contact of the user. In some implementations, the personal relationship information associated with a messaging identifier may be included and/or stored in one or more contact information fields (e.g., name field, notes field, and the like) associated with the contact, and the client device 171 may determine whether the contact information indicates a personal relationship by checking information in the one or more contact information fields for personal relationship information.

If the client device 171 determines that the contact is a personal contact of the user (1303), then the client device 171 provides a user interface associated with a non-business messaging system for display (1310). As described above, examples of the user interface associated with a non-business messaging system for display include, but are not limited to, user interfaces 1270 and 1280 as shown in FIGS. 12C and 12D, respectively.

If the client device 171 determines that the contact is not a personal contact of the user (1303), then the client device 171 determines whether the contact is a business contact of the user (1304). In some implementations, the client device 171 may determine whether the contact is a business contact based on contact information associated with the contact. If the contact information includes information related to a business or an organization, such as a business name or a company name, then the client device 171 may determine that the contact is a business contact and not a personal contact. Examples of information related to a business or organization include, but are not limited to, name of a business, company or organization, information related to some form of incorporation of the business or organization, a toll-free telephone number associated with the contact, information related to a customer support center, and the like. If the contact information does not include information related to a business or an organization, then the client device 171 may determine that the contact is not a business contact.

If the client device 171 determines that the contact is not a business contact of the user (1304), then the client device 171 provides a user interface associated with a non-business messaging system for display (1308). Examples of the user interface associated with a non-business messaging system for display include, but are not limited to, user interfaces 1270 and 1280 as shown in FIGS. 12C and 12D, respectively.

If the client device 171 determines that the selected messaging identifier is not associated with a contact of the user (1302) or if the client device 171 determines that the contact is a business contact (1304), then the client device 171 generates an encoded identifier of the messaging identifier (1305). The client device 171 may be configured to apply an encoding technique (e.g., a hash function) to the messaging identifier to generate an encoded identifier (e.g., a hash value). In one or more implementations, the generated encoded identifier may be associated with other messaging identifiers. For example, a hash function may be selected such that multiple different messaging identifiers, e.g., telephone numbers, hash to the same encoded identifier. In one or more implementations, the client device 171 may be configured to determine whether the messaging identifier is associated with a contact of the user (1302) and/or initiate the generation of the encoded identifier of the messaging identifier (1303) in response to detecting the touch-down event on the messaging identifier and prior to detecting the corresponding touch-up event.

The client device 171 transmits the encoded identifier to a server computing device (1306). The server computing device may include or may be communicatively coupled to the business messaging registration database 157 and/or one or more of the database processing servers 161, and the server computing device may be configured to store and/or organize messaging identifiers, such as telephone numbers, that are registered for the business messaging system. Each messaging identifier stored at the server computing device may be stored in association with a corresponding encoded identifier, such as a hash of the telephone number. When a hash function is selected that results in multiple telephone numbers hashing to the same hash value, multiple of the stored telephone numbers may be stored in association with the same hash value.

The server computing device may be configured to receive the encoded identifier transmitted by the client device 171. Based on the received encoded identifier, the server computing device may be configured to generate a list of messaging identifiers associated with the received encoded identifier that are registered for the business messaging system. To illustrate the previous description with an example, if the messaging identifier is a telephone number and the encoded identifier is a hash of the telephone number, then the server computing device may identify a list of telephone numbers registered for the business messaging system that are stored in association with the received hash value.

In some implementations, the server computing device may identify a list of telephone numbers from a stored list of active known telephone numbers that are stored in association with the received hash value (e.g., some of which may not be registered for the business messaging system). In this instance, based on the identified list of telephone numbers and business messaging account information stored in business messaging registration database 157, and the like, the server computing device may identify a subset of the list of telephone numbers that are registered for the business messaging system.

The server computing device transmits to the client device 171 the list of messaging identifiers that are associated with the received encoded identifier and that correspond to a business or organization that has established a business messaging account. In some implementations, the server computing device may be configured to transmit to the client device 171 information related to the business or organization for each messaging identifier in the list of messaging identifiers. As described above, information related to the business or organization may include, but is not limited to, brand information of the business or organization, logo of the business or organization, hours of operation for a business messaging session, languages supported by the business or organization for the business messaging system, information, such as geographic information, related to segments of the customers that are granted access to the business messaging system, and the like. As described above, certain information related to the business or organization may be specified by the business or organization as filtering criteria or conditions that should be satisfied to successfully engage in a business messaging session with the business or organization. Examples of filtering criteria or conditions may include, but are not limited to, hours of operation during which a business messaging session may be initiated, one or more languages supported for a business messaging session, geographic area of a client device, a list of randomized identifiers of client devices that are granted access to engage in a business messaging session, and the like. In one or more implementations, the server computing device may retrieve the information related to the business or organization from the business messaging registration database 157.

The client device 171 receives the list of messaging identifiers from the server computing device (1307). The client device 171 determines whether the selected messaging identifier is registered with a business messaging system by determining whether the selected messaging identifier is included in the received list of messaging identifiers (1308). If the received list of messaging identifiers includes the selected messaging identifier, then the client device 171 determines that the selected messaging identifier is registered with the business messaging system.

If the client device 171 determines that the selected messaging identifier is registered with the business messaging system (1308), then the client device 171 provides a user interface associated with the business messaging system for display (1309). As described above, the user interface associated with the business messaging system may include one or more messaging options associated with the business messaging system that allow a user to establish or initiate a business messaging session with the business or organization. As shown in FIG. 12B, the client device 171 may provide the messaging option 1261 associated with the business messaging system in a user interface 1260 associated with the business messaging system.

In some implementations, as described above, the user interface 1260 provided by the client device 171 may include a logo associated with the business or organization, open hours of the business messaging team of the business or organization, open hours of the telephone team of the business or organization, visual indicators that inform a user of the different possible actions the user may take (e.g., "text", "chat", "call", and the like), a menu of likely options that the user may wish to select instead of typing a message (e.g., "I have a question about my account"), website associated with the business or organization, and/or any other information that may be provided by the server computing device in conjunction with providing the list of messaging identifiers. In some implementations, as described above, the client device 171 may receive filtering criteria or conditions related to the business or organization associated with each messaging identifier received from the server computing device. The client device 171 may be configured to use the received filtering criteria or conditions to determine whether to display the messaging option associated with business messaging system even if the selected messaging identifier is registered with business messaging system.

For example, if the received filtering criteria or conditions associated with the selected messaging identifier includes a geographical area that is granted access to initiate a business messaging session, via a business messaging system, with the selected messaging identifier, and a current geographical location of the client device is not included in the specified geographical area, then the client device may provide a user interface associated with a non-business messaging system for display (1310) or a messaging option associated with a user messaging system for display. Similarly, if the received filtering criteria or conditions associated with the selected messaging identifier includes a list of randomized identifiers of various client devices that are granted access to initiate a business messaging session, via a business messaging system, with the selected messaging identifier, and a randomized identifier of the client device 171 is not included in the received list of randomized identifiers, then the client device provides a user interface associated with a non-business messaging system or a messaging option associated with a user messaging system.

In one or more implementations, the client device 171 may be configured to determine whether the messaging identifier is registered with the business messaging system (1308) prior to detection of the touch-up event corresponding to the touch-down event that resulted in the selection of the messaging identifier. In this manner, the user interface associated with the business messaging system (1309) or the user interface associated with the non-business messaging system (1310) may be displayed temporally proximate to detection of the corresponding touch-up event.

Since the client device 171 provides the server computing device with an encoded identifier corresponding to the messaging identifier, and since the encoded identifier corresponds to multiple different messaging identifiers (e.g., 10, 50, 100 or any number of messaging identifiers), the server computing device is unable to determine which messaging identifier was actually selected on the client device 171.

In some implementations, the client device 171 may be configured to receive configuration data from the server computing device. Based on the configuration data, the client device 171 may determine information related to types of data structures, databases, partitions and/or shards of the data structures and/or databases, bucketing of the data, and/or clustering of the data used for storing the messaging identifiers and/or encoded identifiers associated with the messaging identifiers at the server computing device. The client device 171 may apply an encoding technique based on such determined information to generate the encoded identifier of the messaging identifier.

To better illustrate the above description of generating an encoded identifier of the messaging identifier, the following example is provided: the configuration data may indicate and/or include information that the encoded identifiers of the messaging identifiers associated with the business messaging system are stored in a number of shards, where each shard may be a separate probabilistic data structure (e.g., a Bloom filter), for which a particular set of encoded identifiers have been added as elements. The messaging identifiers themselves are separated/clustered into sets or buckets of messaging identifiers, where each set or bucket may be stored in a separate data structure.

Based on the information indicated and/or included in the configuration data, the client device 171 may apply an encoding technique, such as a hash function, to the messaging identifier to generate an encoded identifier (e.g., a hash value). The client device 171 may be configured to determine a relevant partition or shard associated with the selected messaging identifier by applying one or more quantitative operations to the encoded identifier and identifying a result of the operations as the relevant partition or shard associated with the selected messaging identifier. For example, the client device 171 may calculate a modulo based on a hash value of the selected messaging identifier (e.g., the encoded identifier) and the number of partitions or shards (e.g., as indicated in the configuration data), and identify the result of the modulo operation as an identifier and/or index of the relevant partition or shard.

The client device 171 may transmit a request for the determined relevant partition or shard to the server computing device, and the server computing device may be configured to transmit the requested partition or shard to the client device 171. The client device 171 may determine whether the encoded identifier of the selected messaging identifier is included in the received partition or shard. For example, if the selected messaging identifier is a telephone number and the encoded identifier is a hash value of the telephone number, then the client device 171 may check for the hash value in the received partition or shard to determine whether the encoded identifier of the selected messaging identifier is included in the received partition or shard.

In implementations where probabilistic data structures, such as Bloom filters, are used, the client device 171 may determine whether the encoded identifier of the selected messaging identifier is likely included in the received partition or shard based on an output indicating a likelihood or a probability of the encoded identifier being included in the received partition or shard. For example, if the output of a query/test for the encoded identifier on the received partition or shard Bloom filter indicates a value of, e.g., false, then the client device 171 determines that the encoded identifier is not included in the received partition or shard Bloom filter. If the output of the query/test indicates that there is a possibility that the encoded identifier is included in the partition or shard Bloom filter, then the client device 171 may determine that the encoded identifier may be included in the received shard Bloom filter.

In some implementations, if the output indicates that there is a possibility of the encoded identifier being included in the partition or shard Bloom filter, then the client device 171 may determine a likelihood of a false positive of the output and, based on the likelihood of the false positive, determine whether the encoded identifier is likely included in the received partition or shard Bloom filter. In some implementations, the output of the query may indicate a likelihood of a false positive corresponding to the result. For example, if the output indicates that there is a possibility of the encoded identifier being included in the partition or shard Bloom filter and that a likelihood of a false positive is below a threshold value, then the client device 171 determines that the encoded identifier is likely included in the received partition or shard Bloom filter.

If the client device 171 determines that the encoded identifier is likely included in the received partition or shard, then the client device 171 determines a relevant bucket that would include the selected messaging identifier based on the encoded identifier of the selected messaging identifier and the number of buckets or clusters. For example, the client device 171 may determine a relevant bucket by calculating a modulo operation based on the encoded identifier and the number of buckets or clusters. The client device 171 transmits a request for the relevant bucket to the server computing device, and the server computing device, in response transmits the requested bucket or cluster to the client device 171.

The client device 171 determines whether the selected messaging identifier is included in the received bucket or cluster. If the client device 171 determines that the selected messaging identifier is included in the received bucket, then the client device 171 may determine that the selected messaging identifier is registered with the business messaging system and may provide a user interface associated with the business messaging system for display. If the client device 171 determines that the selected messaging identifier is not included in the received bucket, then the client device 171 may determine that the selected messaging identifier is not registered with the business messaging system and may provide a user interface associated with a non-business messaging system for display or a messaging option associated with a user messaging system for display.

If the client device 171 determines that the encoded identifier is not included in the received partition or shard, then the client device 171 may determine that the selected messaging identifier is not registered for the business messaging system and may provide a user interface associated with a non-business messaging system for display or a messaging option associated with a user messaging system for display.

Figure 14:
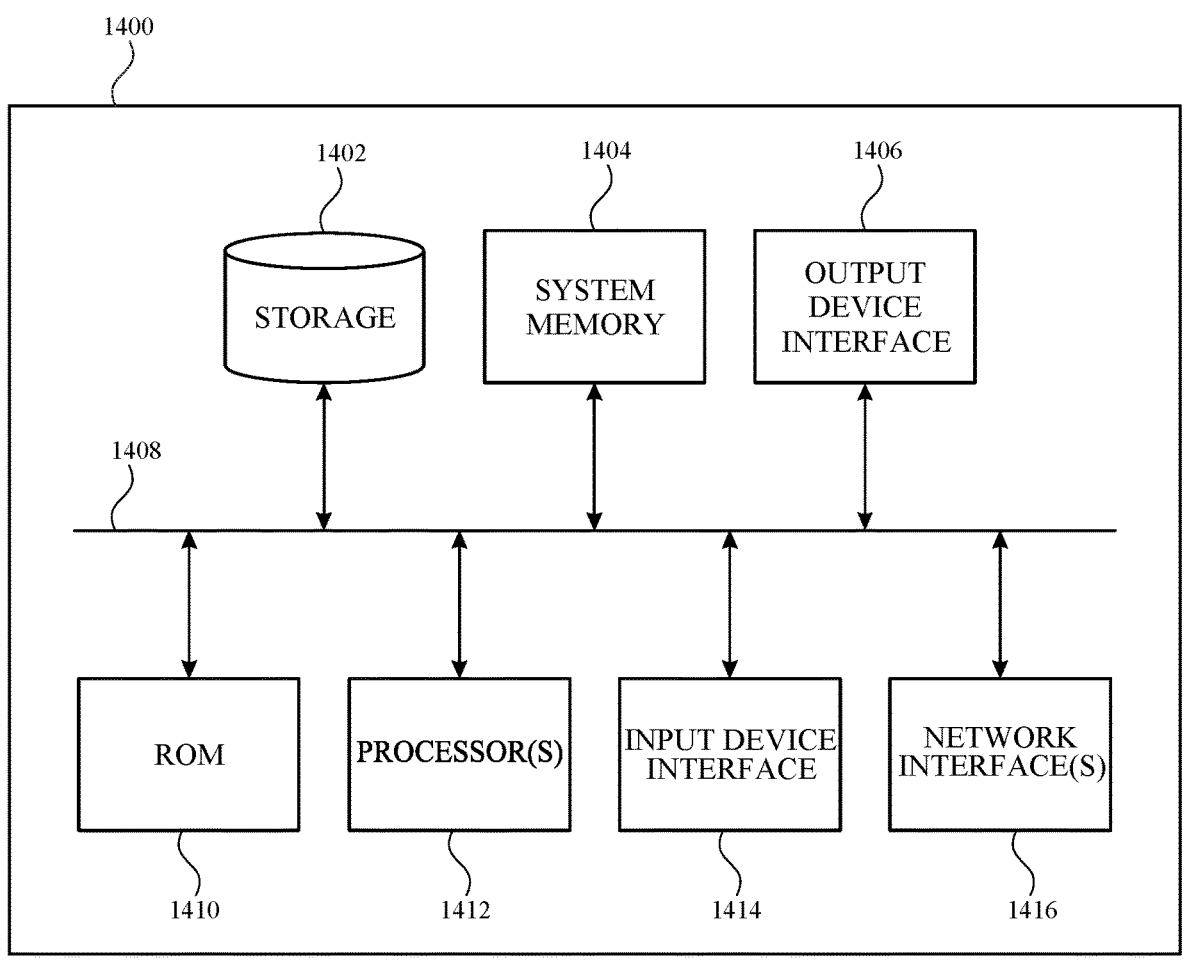
FIG. 14 illustrates an example electronic system with which aspects of the subject technology may be implemented in accordance with one or more implementations.

FIG. 14 illustrates an example electronic system 1400 with which aspects of the subject technology may be implemented in accordance with one or more implementations. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes, through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

As described above, one aspect of the present technology is the gathering and use of data available from specific and legitimate sources to improve initiating business messaging sessions. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine whether to initiate a business messaging session in accordance with a user's preferences and/or businesses or organizations preferences. Accordingly, use of such personal information data enables users to have greater control of the devices for which business messaging is enabled. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of initiating a business messaging session, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a business messaging session can be initiated based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving an identifier at a device;
   generating, by the device, an encoded identifier based on the identifier;
   requesting, by the device, a cluster of identifiers from a remote server using the encoded identifier generated by the device;
   receiving, by the device responsive to the requesting, the cluster of identifiers from the remote server;
   determining, by the device, whether the identifier is included in the received cluster of identifiers received from the remote server; and
   in response to a determination that the identifier is included in the received cluster of identifiers, providing, by the device, a first user interface associated with the identifier.

2. The method of claim 1, wherein generating the encoded identifier comprises generating, using a hash function, a hash of the identifier, wherein the hash function generates the hash for multiple different identifiers.

3. The method of claim 1, further comprising, prior to requesting the cluster of identifiers from the remote server, determining, by the device and based on the encoded identifier, whether the identifier is likely to be included in the cluster of identifiers.

4. The method of claim 3, wherein determining whether the identifier is likely to be included in the cluster of identifiers comprises providing the encoded identifier to a Bloom filter.

5. The method of claim 4, wherein determining whether the identifier is likely to be included in the cluster of identifiers further comprises:
   receiving an output of the Bloom filter that indicates that the encoded identifier may exist in a data structure; and
   determining a likelihood of a false positive of the Bloom filter.

6. The method of claim 5, further comprising, prior to providing the encoded identifier to the Bloom filter, identifying the data structure based on the encoded identifier and a number of data structures at the remote server.

7. The method of claim 4, wherein requesting the cluster of identifiers comprises requesting the cluster of identifiers in response to a determination, based on an output of the Bloom filter, that the identifier is likely to be included in the cluster of identifiers.

8. The method of claim 1, further comprising, prior to requesting the cluster of identifiers, identifying, by the device, the cluster of identifiers at the remote server based on the encoded identifier.

9. The method of claim 1, further comprising, in response to a determination that the identifier is not included in the received cluster of identifiers, providing, by the device, a second user interface that is unassociated with the identifier.

10. The method of claim 9, wherein the cluster of identifiers comprises a cluster of identifiers of business that are registered with a business messaging system, and wherein providing the first user interface comprises, in response to the determination that the identifier is included in the received cluster of identifiers:
    determining that the identifier is an identifier of one of the businesses that is registered with the business messaging system; and
    providing the first user interface, the first user interface being associated with the business messaging system.

11. The method of claim 10, wherein providing the second user interface comprises, in response to the determination that the identifier is not included in the received cluster of identifiers:
    determining that the identifier is not registered with business messaging system; and providing the second user interface, the second user interface being a user messaging system.

12. A device, comprising:
memory; and
one or more processors configured to:
receive an identifier;
generate an encoded identifier based on the identifier;
request a cluster of identifiers from a remote server using the encoded identifier;
receive the cluster of identifiers from the remote server;
determine whether the identifier is included in the received cluster of identifiers received from the remote server; and
in response to a determination that the identifier is included in the received cluster of identifiers, provide a first user interface associated with the identifier.

13. The device of claim 12, wherein the one or more processors are further configured to, in response to a determination that the identifier is not included in the received cluster of identifiers, provide a second user interface that is unassociated with the identifier.

14. The device of claim 12, wherein the encoded identifier comprises a hash of the identifier.

15. The device of claim 12, wherein the one or more processors are further configured to, prior to requesting the cluster of identifiers from the remote server, determine, based on the encoded identifier, whether the identifier is likely to be included in the cluster of identifiers.

16. The device of claim 15, wherein the one or more processors are configured to determine whether the identifier is likely to be included in the cluster of identifiers by providing the encoded identifier to a Bloom filter.

17. A non-transitory machine-readable medium comprising instructions that, when executed by one or more processors, cause the one or more processors to perform operations comprising:
receiving an identifier;
generating an encoded identifier based on the identifier;
requesting a cluster of identifiers from a remote server using the encoded identifier;
receiving the cluster of identifiers from the remote server;
determining whether the identifier is included in the received cluster of identifiers received from the remote server; and
in response to a determination that the identifier is included in the received cluster of identifiers, providing, a first user interface associated with the identifier.

18. The non-transitory machine-readable medium of claim 17, the operations further comprising, in response to a determination that the identifier is not included in the received cluster of identifiers, providing a second user interface that is unassociated with the identifier.

19. The non-transitory machine-readable medium of claim 17, the operations further comprising, prior to requesting the cluster of identifiers from the remote server, determining, based on the encoded identifier, whether the identifier is likely to be included in the cluster of identifiers.

20. The non-transitory machine-readable medium of claim 19, wherein determining whether the identifier is likely to be included in the cluster of identifiers comprises providing the encoded identifier to a Bloom filter.

* * * * *